US012280991B2

(12) United States Patent
Christian et al.

(10) Patent No.: US 12,280,991 B2
(45) Date of Patent: Apr. 22, 2025

(54) APPARATUSES AND METHODS FOR PROVIDING HIGH ELECTRICAL RESISTANCE FOR AERIAL WORK PLATFORM COMPONENTS

(71) Applicant: Time Manufacturing Company, Waco, TX (US)

(72) Inventors: James Randall Christian, Crawford, TX (US); Andrew Keith Palican, Woodway, TX (US)

(73) Assignee: Time Manufacturing Company, Waco, TX (US)

(*) Notice: Subject to any disclaimer, the term of this patent is extended or adjusted under 35 U.S.C. 154(b) by 0 days.

(21) Appl. No.: 16/567,812

(22) Filed: Sep. 11, 2019

(65) Prior Publication Data

US 2020/0002955 A1 Jan. 2, 2020

Related U.S. Application Data

(60) Continuation of application No. 15/682,441, filed on Aug. 21, 2017, now Pat. No. 10,458,131, which is a (Continued)

(51) Int. Cl.
*B66F 11/04* (2006.01)
*H01B 17/56* (2006.01)

(52) U.S. Cl.
CPC ............ *B66F 11/04* (2013.01); *B66F 11/044* (2013.01); *H01B 17/56* (2013.01)

(58) Field of Classification Search
CPC .......... B66F 11/04; B66F 11/044; E04G 5/06; H01B 17/56; Y10T 137/8593; E02F 9/2275
See application file for complete search history.

(56) References Cited

U.S. PATENT DOCUMENTS 2,877,660 A 3/1959 Rush
3,132,718 A * 5/1964 Pierce, Jr. ............. B66F 11/044 182/129

(Continued)

FOREIGN PATENT DOCUMENTS

AU 462627 8/1969
GB 2060079 A * 4/1981 ............ B66F 11/044

(Continued)

OTHER PUBLICATIONS

Extended Search Report for EP 20196552.2 dated Feb. 8, 2021.
Office Action dated Aug. 7, 2019 Japan Patent Application No. 2018-104894.

*Primary Examiner* — Colleen M Chavchavadze
(74) *Attorney, Agent, or Firm* — Bryan Cave Leighton Paisner LLP

(57) ABSTRACT

Methods, systems and apparatuses for providing high electrical resistance for an upper control assembly (including control handles) of an aerial lift are provided through an isolation member that is integral to the upper control assembly and interposed between fluid lines in the control assembly and a set of fluid conduits that extend from the control assembly towards other portions of the aerial lift. The isolation member is a dielectric element that comprises a manifold that is made of material that is substantially electrically non-conductive, and that has a plurality of through-holes or hoses configured to allow hydraulic fluid to flow through the isolation member into and out of the fluid lines and conduits. These methods, systems and apparatuses are preferably used in upper control assemblies of aerial platforms that can carry one or more operators in order to prevent such operators from electrocution when controlling the lift.

9 Claims, 17 Drawing Sheets

Related U.S. Application Data division of application No. 14/872,939, filed on Oct. 1, 2015, now Pat. No. 9,765,538, which is a continuation of application No. 13/487,012, filed on Jun. 1, 2012, now Pat. No. 9,683,379.

(56) References Cited

U.S. PATENT DOCUMENTS

| | | | | | |
|---|---|---|---|---|---|
| 3,489,243 | A | | 1/1970 | Prescott et al. | |
| 3,516,514 | A | * | 6/1970 | Dold | B66F 11/044 182/148 |
| 3,757,895 | A | * | 9/1973 | Knutson | B66F 11/044 182/2.4 |
| 4,051,860 | A | | 10/1977 | Dowd et al. | |
| 4,724,924 | A | * | 2/1988 | Breyer | B66F 11/044 74/491 |
| 4,730,543 | A | * | 3/1988 | Holmes | B66F 11/044 91/461 |
| 4,762,199 | A | * | 8/1988 | Holmes | B66F 11/044 182/148 |
| 4,851,703 | A | * | 7/1989 | Means | F04B 17/03 290/1 R |
| 7,353,817 | B2 | * | 4/2008 | Kobel | A62B 1/22 125/12 |
| 7,748,496 | B2 | * | 7/2010 | Higgins | B66F 11/044 182/2.11 |
| 8,550,211 | B2 | * | 10/2013 | Higgins | B66F 11/044 182/2.4 |
| 8,550,212 | B2 | * | 10/2013 | Higgins | B66F 11/044 182/2.4 |
| 10,557,603 | B2 | * | 2/2020 | Walker | B66F 11/046 |
| 10,707,869 | B2 | * | 7/2020 | Rasmussen | H03K 17/965 |
| 2012/0211301 | A1 | * | 8/2012 | Clark | B66F 17/006 182/2.2 |

FOREIGN PATENT DOCUMENTS

| | | |
|---|---|---|
| JP | H06-287000 | 10/1994 |
| JP | H02-018491 | 2/2019 |

* cited by examiner

APPARATUSES AND METHODS FOR PROVIDING HIGH ELECTRICAL RESISTANCE FOR AERIAL WORK PLATFORM COMPONENTS

CROSS-REFERENCE TO RELATED APPLICATIONS

The present application is a continuation application of U.S. patent application Ser. No. 15/682,441 filed on Aug. 21, 2017, which is a divisional application of U.S. patent application Ser. No. 14/872,939 filed on Oct. 1, 2015, now U.S. Pat. No. 9,765,538, which is a continuation of U.S. patent application Ser. No. 13/487,012 filed on Jun. 1, 2012, now U.S. Pat. No. 9,683,379. The entire contents of the aforementioned applications are incorporated by reference as if recited in full herein.

FIELD OF THE INVENTION

The invention is directed to apparatuses and methods for providing high electrical resistance for control panels, assemblies, and/or handles in aerial work platforms. More particularly, the apparatuses and methods are preferably used in upper control assemblies coupled to aerial lift work platforms that can carry one or more operators in order to prevent such operators from electrocution when controlling the lift.

BACKGROUND OF THE INVENTION

Aerial lifts are commonly used in the electric utility industry to facilitate work at an elevated position in several areas such as utility pole, telephone or power lines, street lights, building walls, etc. Such aerial lifts typically boast work platforms (e.g., a workstation in the form of a bucket) coupled to wheeled vehicles through a multiple section-boom that is adapted to elevate and orient the aerial platform which carries the personnel who can perform the requisite work. The personnel also typically control the operation of the lift from the aerial platform or bucket through a control assembly that is coupled to the bucket and that includes several handles which can be used to manipulate the position and orientation of the bucket by controlling, among others, the multi-section boom. The control assembly may be equipped with other handles that can be used to control material handling equipment or other tools that may be removably attached to bucket (e.g., a jib, winch, drill, saw). The American National Standards Institute (ANSI) Accredited Standard Committee has issued standards pertaining to such aerial lifts which are known as ANSI A92.2.

Commonly, aerial lifts utilize hydraulics systems to control bucket movement and equipment. As such, the control assembly typically includes control valves connected to handles, as well as hydraulic fluid that flows through these valves and through fluid conduits which mostly extend along the boom section in order to translate control inputs from the handles into corresponding component movement that enables the bucket and equipment to operate as desired. Much like many components in the control assembly, the valves to which the control handles are connected are typically constructed of an electrically conductive material. Moreover, these components are located in close proximity to, if not in physically contact with, the boom section which incorporates structural material (i.e., typically an electrically conductive metal such as steel and/or aluminum) so as to have sufficient structural strength to support the bucket and personnel. The boom section typically rests on a vehicle which, needless to say, is also made of several metal parts in physical contact with the ground. Thus, the control assembly, including many of its components, may be considered electrically connected to the ground.

Because the bucket may be positioned close to highly-charged electrical lines, all of the aforementioned control handles disposed within the bucket's vicinity (which are often referred to as upper controls) ought to be as electrically isolated as possible in order to prevent electrocution of any personnel or operator(s) that may come in contact with the electrical lines and the handles or otherwise fail to comply with safety measures and regulations. To this end, ANSI Standard A92.2 standards state that such upper controls should be equipped with high electrical resistance components. Existing techniques to provide high electrical resistance include using materials that are substantially non-conductive, such as plastic or similar composites, to construct the handles and portions with which personnel may come in contact. However, such materials (even when reinforced) tend to not have sufficient structural strength and rigidity to withstand continuous manipulation by operators who apply enough force on the handles, causing the handle bodies to twist in undesirable directions, or even break. On the other hand, cost-effective materials having sufficient rigidity and durability typically include metal or some form of conductive substance, and therefore risk causing electrocution to the personnel by creating a discharge path from the handle to the ground, if the handle is not substantially isolated from other contiguous portions that are electrically connected to the ground, as described above. Therefore, it is desirable to provide high electrical resistance for control handles such that they are substantially electrically isolated from other contiguous portions in the control assembly, conduits or boom section, while maintaining the ability to construct the handles from electrically conductive material so as to preserve structural rigidity of the handles.

Moreover, it is common and often advantageous for other portions in the control assembly to be constructed from electrically conductive material. For example, the valves and/or portions of fluid lines can be made of metal so that they may have sufficient thermal and structural properties to withstand hydraulic fluid movement at varying conditions. However, these other components of the control assembly also pose a risk of electrocution given that they can be electrically connected to the handles and the ground, as specified above. Furthermore, these components pose another risk since they may come in contact with a tool handled by the personnel and therefore create a discharge path from the tool grip to grounded control assembly components (e.g., the blade of a saw improperly placed through an opening in the control panel may extended downwards into the inner portions of the assembly and come in contact with one or more fluid lines.) Therefore, it is further desirable to provide a mechanism for providing high electrical resistance for the valves and fluid lines inside the control assembly such that they are substantially electrically isolated from other contiguous aerial lift components such as fluid conduits and/or tools or boom sections along which the conduits extend, while maintaining the ability to construct the valves and fluid lines from electrically conductive material so as to preserve thermal and structural properties.

Therefore, there is a need for mechanisms that provide high electrical resistance for several components of aerial work platforms (particularly ones used in hydraulic lifts), including the upper control assembly and handles in a comprehensive, one-size fits all, and cost-efficient manner that preserves the ability to construct desired components from electrically conductive material.

SUMMARY OF PARTICULAR EMBODIMENTS OF THE INVENTION

In various embodiments, the invention provides methods, systems and apparatuses for providing high electrical resistance for upper controls (including the assembly and control handles) of an aerial lift through an isolation member that is integral to the upper control assembly. The isolation member is coupled to, and interposed between, fluid lines in the control assembly and a set of fluid conduits that extend from the control assembly towards other portions of the aerial lift. The isolation member is a dielectric element that comprises a manifold, casing or plates made from material that is substantially electrically non-conductive and that has a plurality of through-holes or hoses configured to allow hydraulic fluid to flow through the isolation member into and out of the fluid lines and conduits.

The manifold or plates making up the isolation member may be a block in the shape of a cuboid that is constructed from a thermoplastic material (e.g., a nylon plastic), a thermosetting plastic material, or a fibre-reinforced plastic material. The isolation member may also include two sets of fittings or other connectors. The first set is disposed proximate to the first face of the manifold, whereby the fittings/connectors are coupled to the manifold and to the fluid lines in the upper control assembly to direct flow of the hydraulic fluid from one of the fluid lines into the isolation member or to direct flow of the hydraulic fluid from the isolation member into one other of the fluid lines. The second set is disposed proximate to the second face of the manifold, whereby the fittings/connectors are coupled to the manifold and to the fluid conduits that extend from the control assembly towards either a lower portion of the aerial lift or a set of tools coupled to the aerial lift, to direct flow of the hydraulic fluid from one of the fluid conduits into the isolation member or to direct flow of the hydraulic fluid from the isolation member into one other of the fluid conduits. The first and second set of fittings/connectors may be screwed directly into the manifold or into face plates such as aluminum plates that sandwich the manifold.

The isolation member is a cost-efficient, one-size-fits-all device that provides high electrical resistance for the control panel and control handles of work platforms in aerial lifts in a manner that preserves the ability to construct desired components (such as the control handles and fluid lines) from electrically conductive material, while preventing operators in the work platform from electrocution when controlling the lift.

For the purposes of the discussion, materials that are substantially non-conductive, as well as techniques that substantially isolate components, and therefore provide high electrical resistance are such that they preferably meet, if not exceed, ANSI Standard A92.2. For example, when the methods, systems and apparatuses discussed herein (including the use of the isolation member with the control assembly) are tested at 40 kV (e.g., for about 3 minutes or more), no more than 400 microamperes in current preferably can flow through any of the upper controls.

Other benefits and features may become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

Further features of the invention, its nature and various advantages will be more apparent from the following detailed description of the embodiments, taken in conjunction with the accompanying drawings in which.

DETAILED DESCRIPTION OF EMBODIMENTS OF THE INVENTION

Apparatuses and methods for providing high electrical resistance for control panels, assemblies, and/or handles in aerial work platforms of aerial lifts are described herein in relation to FIGS. 1-7. These apparatuses and methods are preferably used in upper control assemblies of such platforms that can carry one or more operators in order to prevent such operators from electrocution when controlling the lift, and satisfy ANSI Standard A92.2.

Figure 1A:
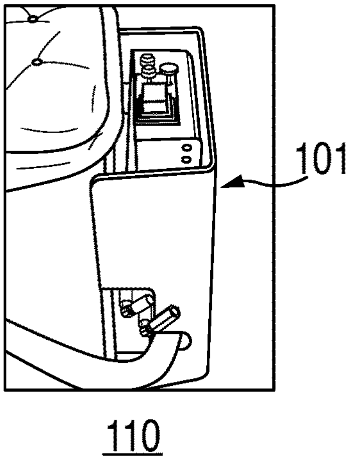
FIG. 1A is an enlarged view of a portion of the work platform including the upper control assembly of FIG. 1.
Figure 1:
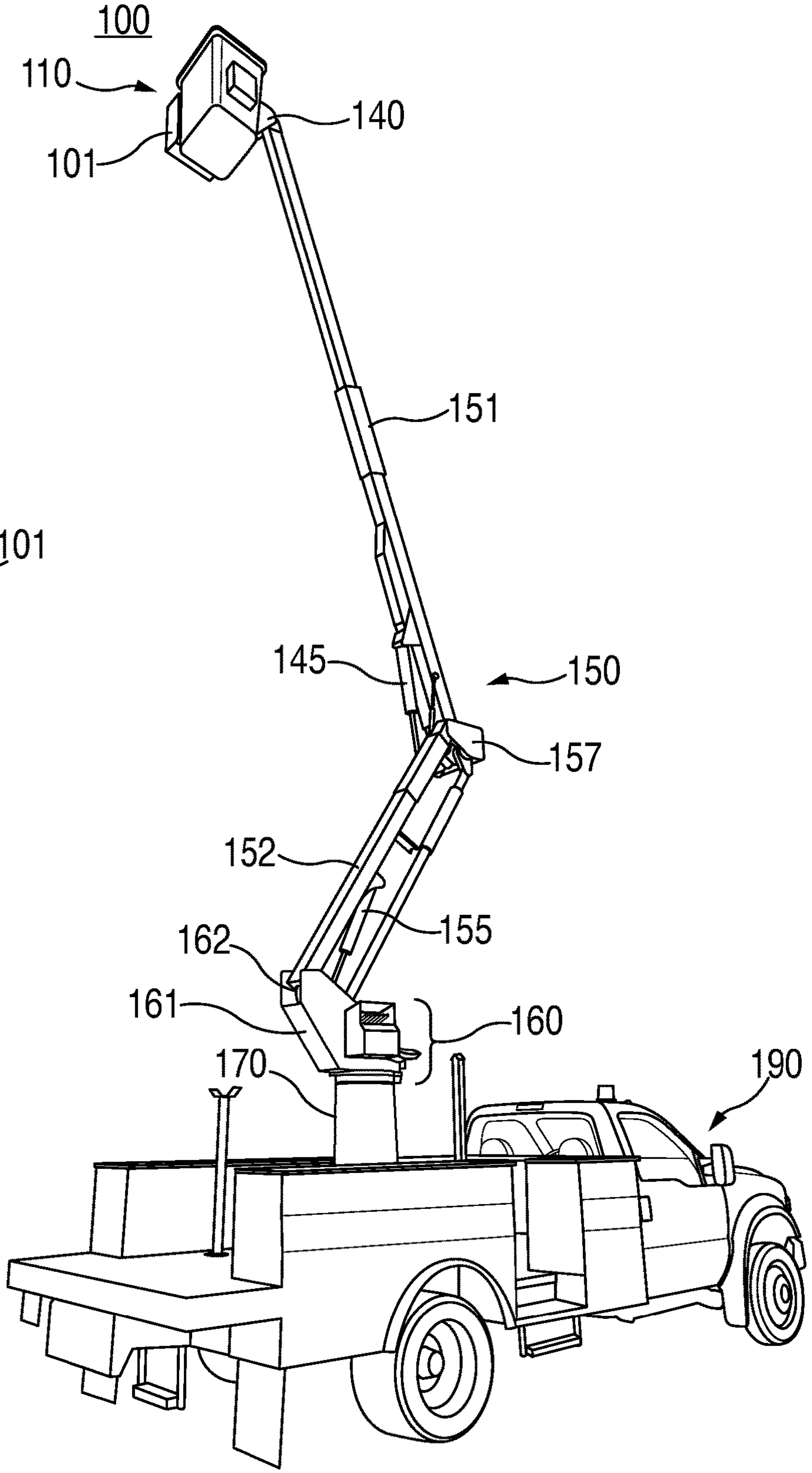
FIG. 1 is a perspective view of an aerial lift having an upper control assembly coupled to a work platform in which embodiments of the invention may be implemented.

FIG. 1 depicts an aerial lift 100 in which embodiments of the invention may be implemented. Much like common vehicle-mounted aerial lifts (also known as bucket trucks), aerial lift 100 may generally have an aerial work platform 110 that is coupled to a wheeled vehicle 190 (such as a truck) through a boom section 150 that comprises at least one or more booms, as well as a rotation system 160 which includes turret 161. Preferably, boom section 150 comprises two booms: upper boom 151, and lower boom 152, one or both of which is extendable. Typically, upper boom 151 includes an inner boom which may be extended or retracted.

Work platform 110, boom section 150 and rotation system 160 may be referred to collectively as an aerial assembly which can be mounted on, and dismounted from, the bed of wheeled vehicle 190, or any other appropriate base, through a pedestal 170. Turret 161 may be rotated about a vertical axis (not shown) of pedestal 170 in order to rotate the aerial assembly, including platform 110. The bottom end of lower boom 152 may be pivotally connected to turret 161 through pin 162, so as to pivot about a horizontal axis (not shown) of pin 162 through lower boom cylinder 155 in order to lower or raise lower boom 152. The top end of lower boom 152 may be pivotally connected to the bottom end of upper boom 151 at elbow 157. Upper boom 151 may pivot about a horizontal axis (not shown) of elbow 157 through upper boom cylinder 145 in order to lower or raise upper boom 151 (or the outer boom section of upper boom 151). The top end of upper boom 151 (or the inner boom section of upper boom 151) may be coupled to platform 110 through a platform shaft retaining assembly 140. A Leveling system may maintain platform 110 level to the ground at all boom positions through a master-slave cylinder circuit (not shown).

FIG. 1A illustrates an enlarged view of a portion of work platform 110 with a focus on control assembly 101. Control assembly 101 is an upper control assembly, i.e., an assembly that includes controls that can be used by an operator carried by aerial work platform 110 to manipulate aerial lift 100, and particularly the components of the aerial assembly discussed above (e.g., boom(s), turret), so as to move and position platform 110 as desired. Other controls may be disposed in a lower control assembly (not shown), which is typically in the vicinity of rotation system 160 and/or pedestal 170, and allows users to manipulate some of the same components from the ground. The motions or functions that can be controlled through the upper and/or lower control assembly include the raising and/or lowering of lower boom 152 and/or upper boom 151, the extension and/or retraction of (the inner boom of) upper boom 151, the rotation of the turret 160, and the rotation of platform 110.

The exemplary lift discussed above illustrates various types of motions that can be controlled using hydraulic systems, such as boom raising/lowering through hydraulic cylinder(s), boom extension/retraction through hydraulic cylinder(s), turret or platform rotation through a hydraulic rotary actuator, and platform leveling through a hydraulic cylinder circuit. Hydraulic fluid may flow from a fluid reservoir or tank typically located in pedestal 170 through fluid conduits which extend along the boom section, and through various components of control assembly 101 in order to translate control inputs from handles disposed on aerial platform 110 and elsewhere into corresponding component movements that enable the platform and any attached equipment to operate as desired. A smaller number of motion types may be available for control in other lifts. For example, only one boom can be raised/lowered in certain lifts. As another example, the upper boom of certain lifts may not be extendable (i.e., it may not have an inner and outer boom portions). Similarly, additional types of motions that have not been discussed may also be available for control. The above discussion and corresponding drawing is merely used to illustrate one type of aerial lift to which the principles of the invention is applicable, with the understanding that other types may also be appropriate.

Figure 2A:
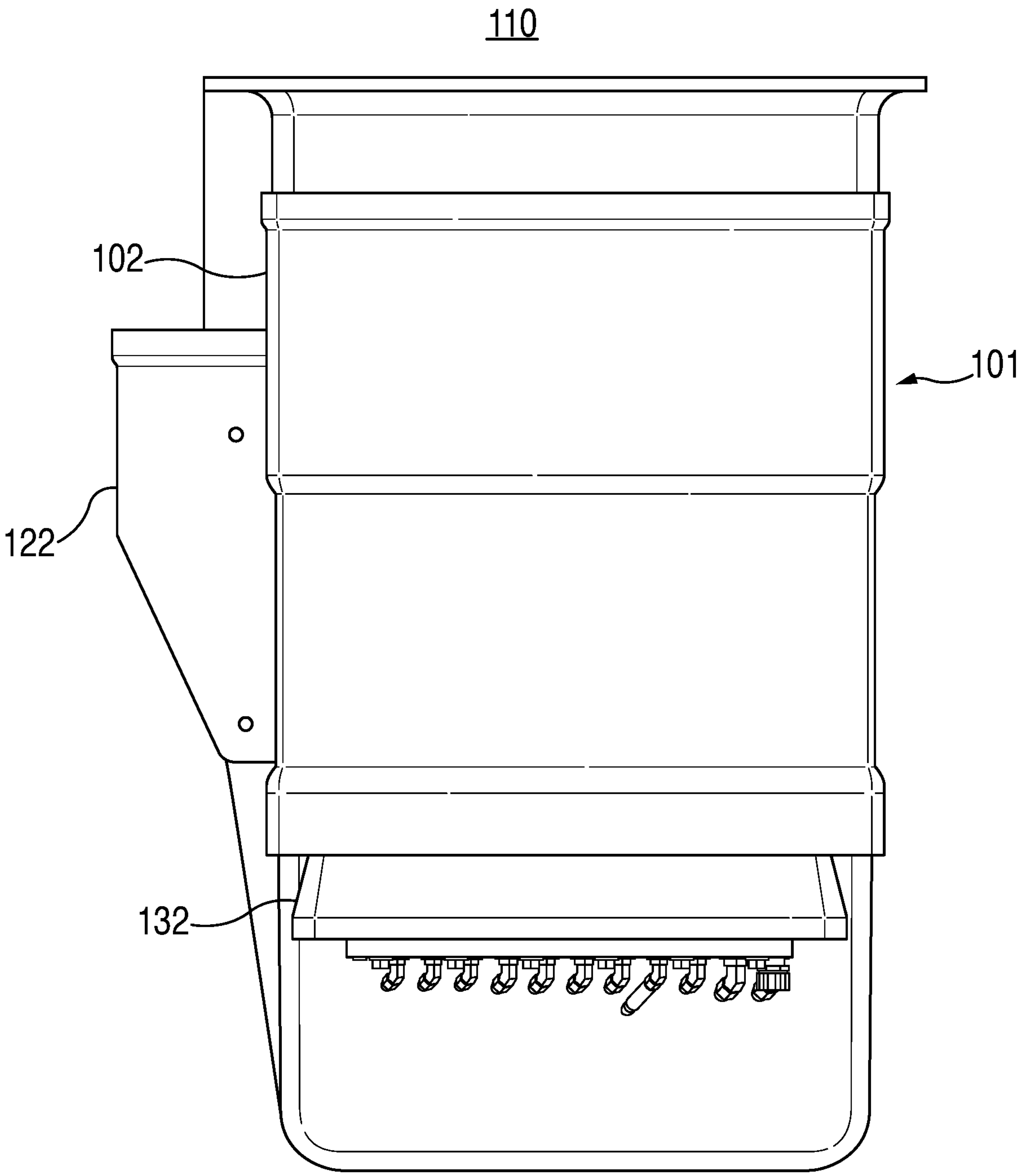
FIG. 2A is a side view of the work platform taken from the side on which the upper control assembly of FIG. 1 is disposed in accordance with certain embodiments.
Figure 2B:
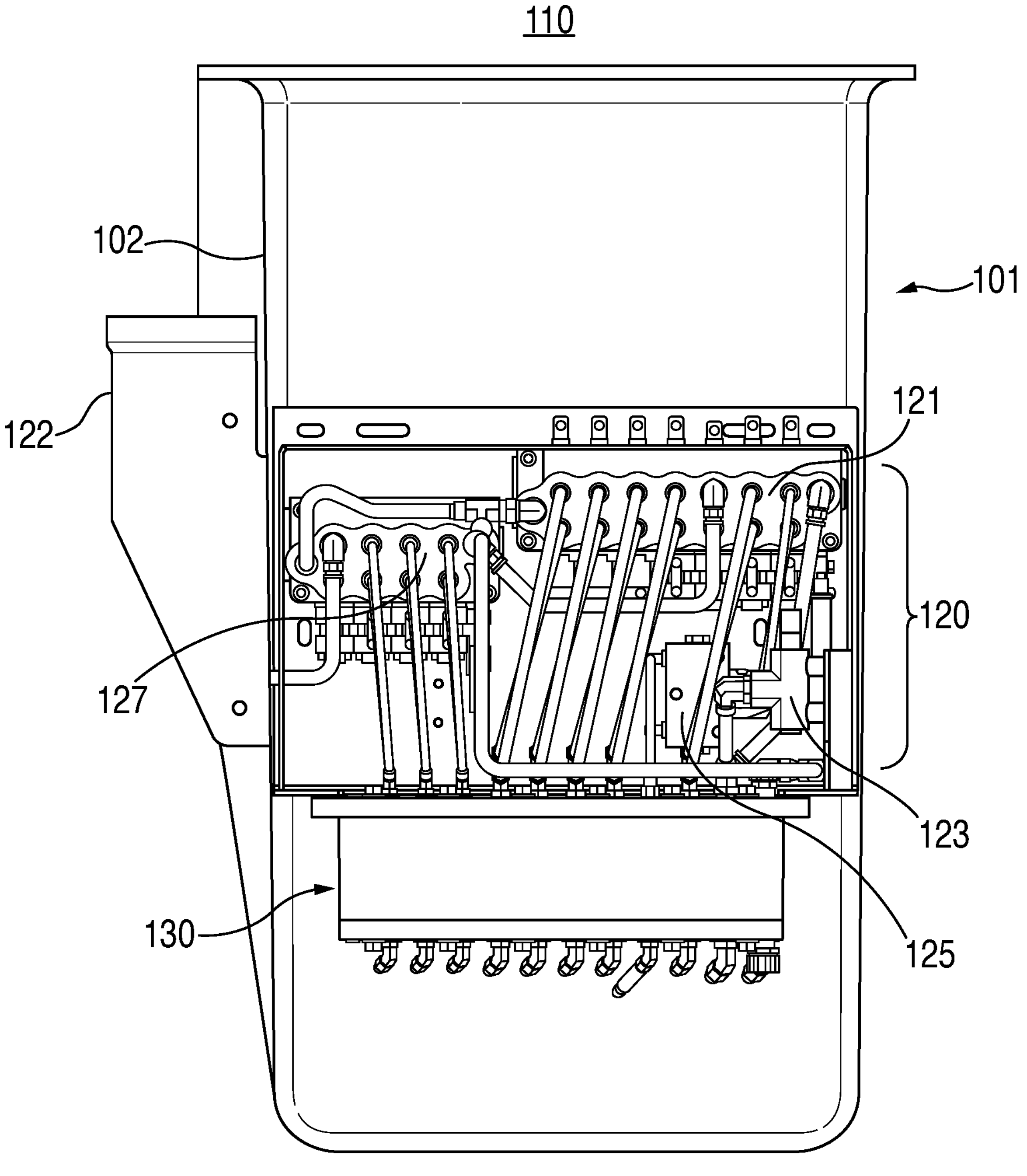
FIG. 2B is a sectional view of the work platform taken from the side on which the upper control assembly of FIG. 1 is disposed in accordance with certain embodiments.
Figure 3:
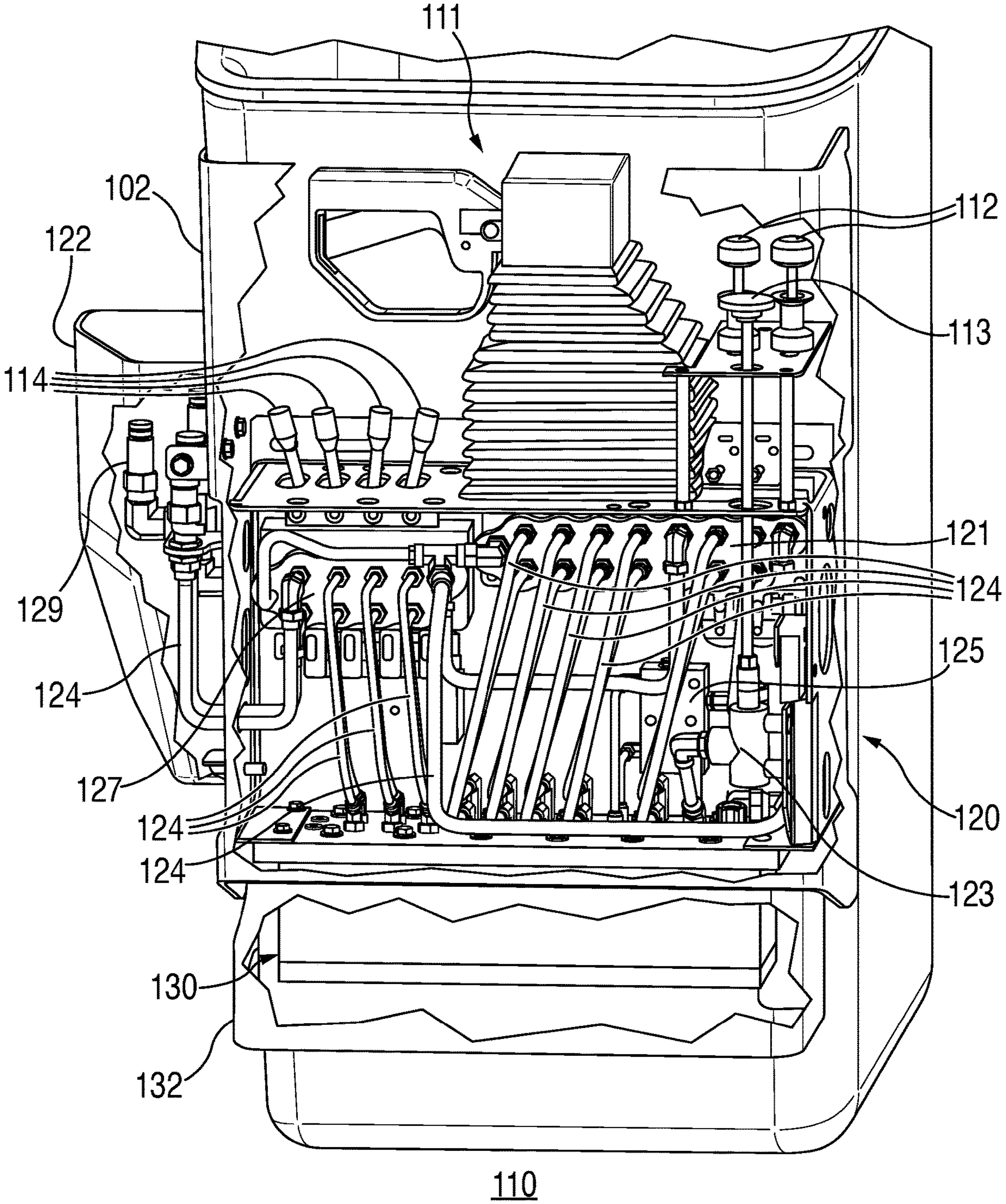
FIG. 3 is an elevational view of the upper control assembly of FIGS. 1, 1A and 2 in accordance with certain embodiments.

FIGS. 2 and 3 depict upper control assembly 101 in more detail according to certain embodiments, such that FIGS. 2A and 2B are two-dimensional side views—while FIG. 3 is a three-dimensional perspective view—showing the upper control assembly depicted in FIGS. 1 and 1A as part of aerial platform 110. More particularly, FIG. 2A shows a side view of the control assembly, while FIG. 2B shows a sectional view of a portion of the control assembly which may be referred to as a control panel 120 coupled to isolation member 130, and FIG. 3 shows a perspective elevational view of the inner components of the control assembly such that an upper cover 102 is shown in FIG. 2A, is partially shown in FIG. 2B (with its lower part shown in a sectional fashion), and is depicted in transparent fashion in FIG. 3. Similarly, a side cover 122 pertaining to hydraulic tools (not shown) such as a drill is depicted in transparent fashion in FIG. 3, whereas it is depicted in solid fashion in FIGS. 2A and 2B. Finally, a lower cover 132 pertaining to isolation member 130 is depicted in transparent fashion in FIG. 3 and is shown in solid fashion in FIG. 2A (but is not shown in FIG. 2B). Upper cover 102 extends from and covers a series of controls or control handles which can be seen in FIGS. 1A and FIG. 3, down to control panel 120.

Figure 8A:
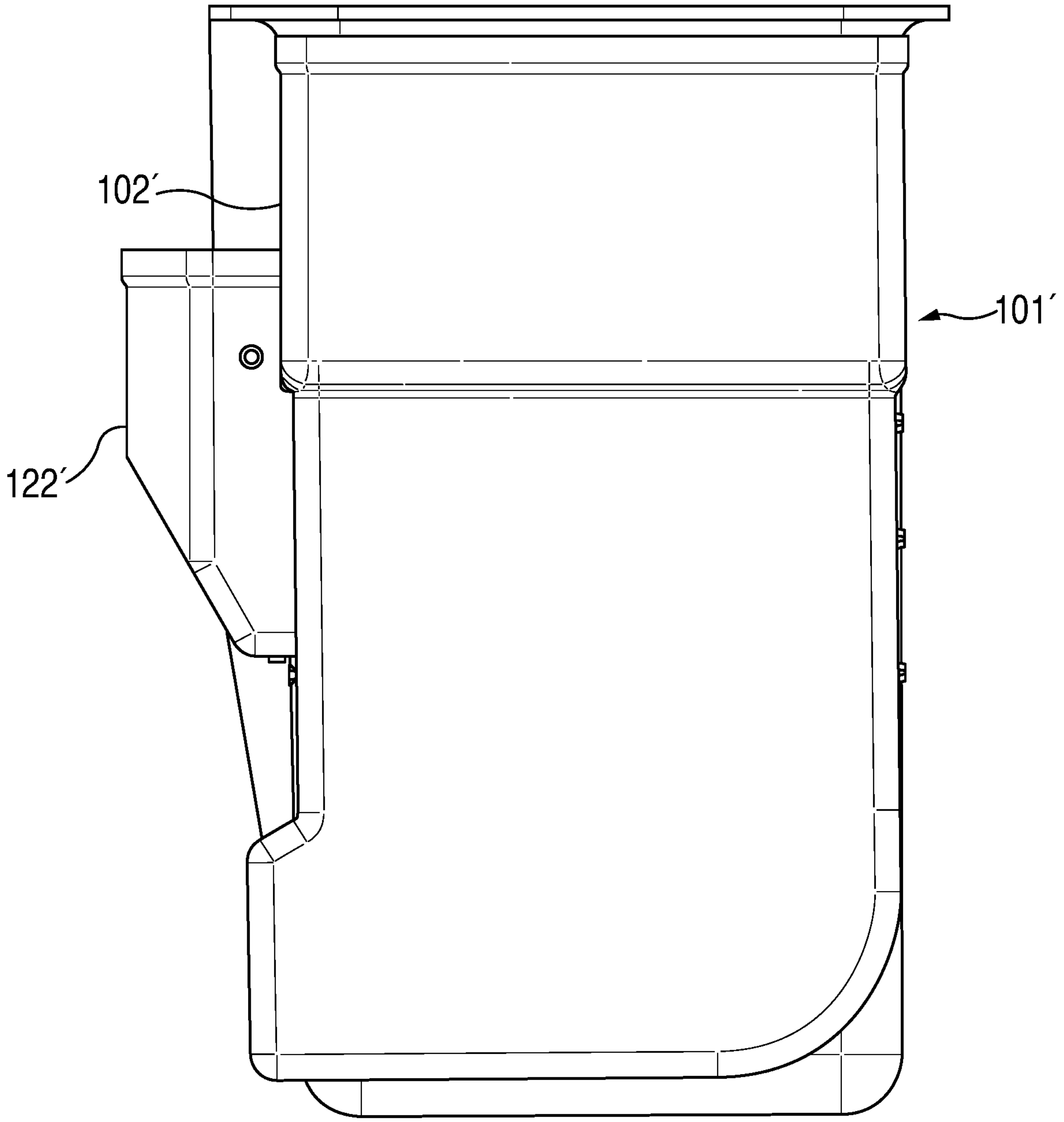
FIG. 8A is a side view of certain other embodiments of the work platform of FIG. 1 taken from the side on which the upper control assembly is disposed.
Figure 8B:
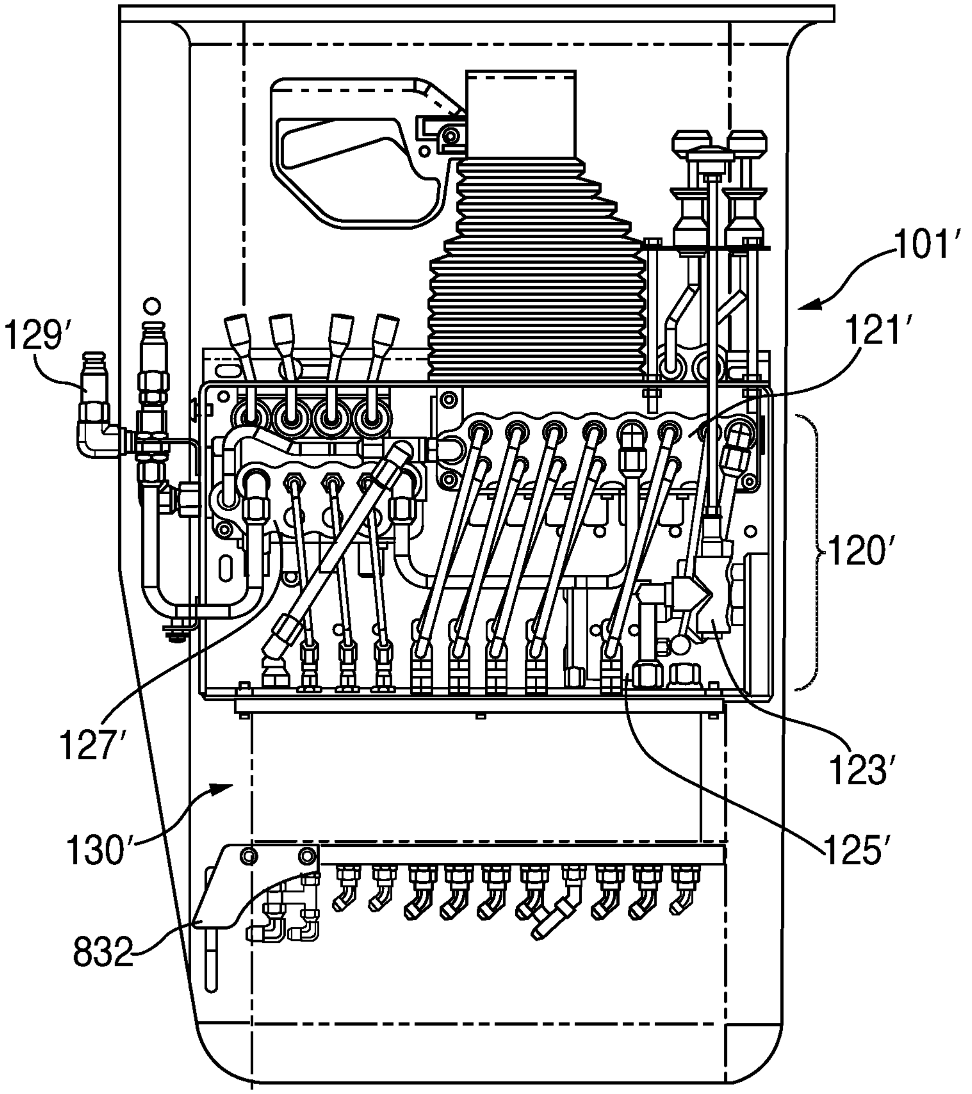
FIG. 8B is a sectional view of the work platform of FIG. 8A taken from the side on which the upper control assembly is disposed in accordance with certain embodiments.
Figure 9:
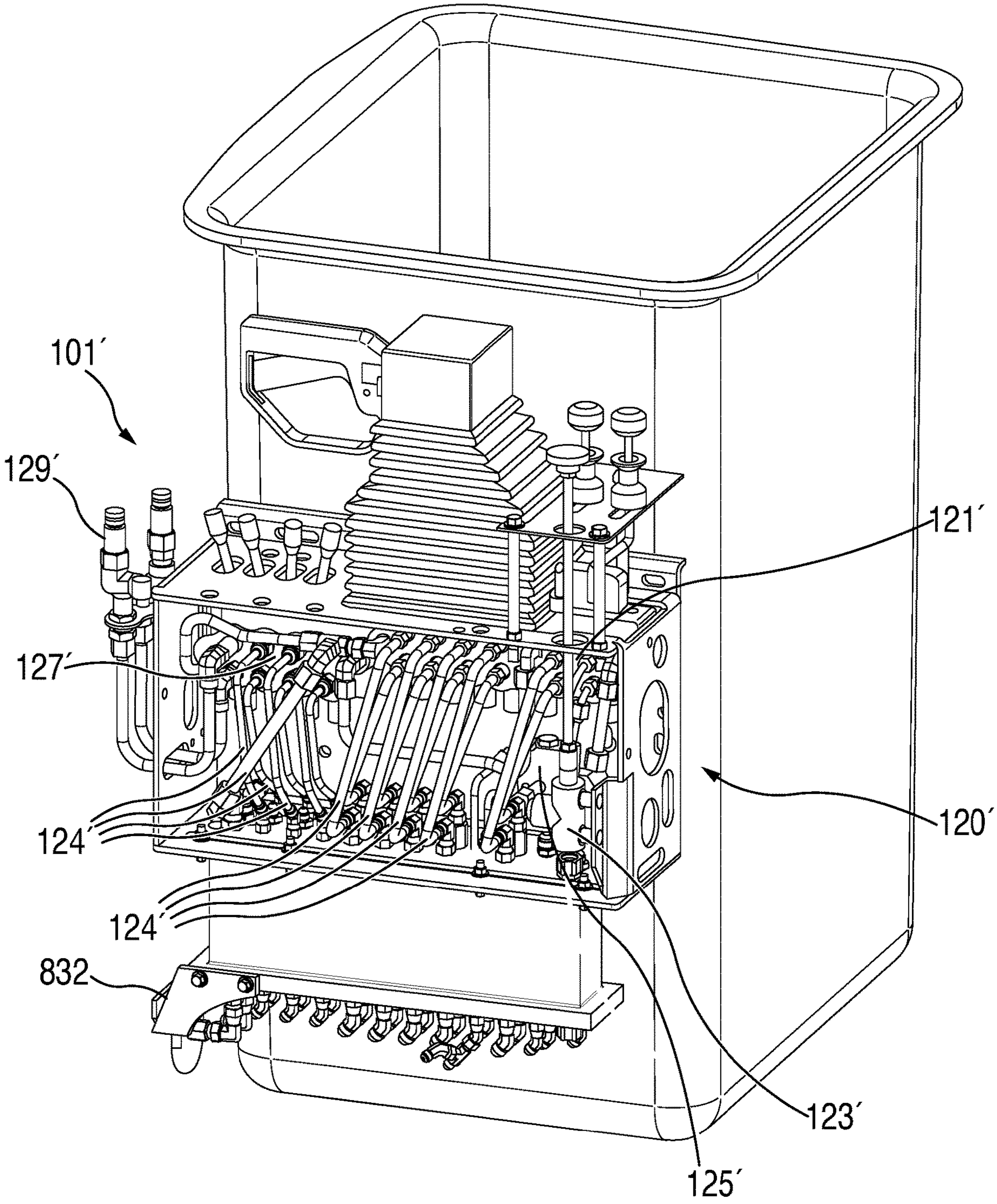
FIG. 9 is an elevational view of the upper control assembly of FIGS. 1, 1A and 8 in accordance with certain embodiments.

FIGS. 8 and 9 depict alternative embodiments of the upper control assembly of FIGS. 1 and 1A such that FIGS. 8A and 8B are two-dimensional side views—while FIG. 9 is a three-dimensional perspective view. More particularly, the upper control assembly of FIGS. 8 and 9 may be referred to as upper control assembly 101' where FIG. 8A shows a side view of the control assembly, while FIG. 8B and FIG. 9 show a sectional view and a perspective elevational view, respectively, of a portion of the inner components of the control assembly control assembly. Control assembly 101' includes control panel 120' which is coupled to isolation member 130'. FIG. 8A shows control assembly 101' covered and having an upper cover 102', a side cover 122' pertaining to hydraulic tools (not shown). While side cover 122 and 122' of FIGS. 2A and 8A are similar if not identical, upper cover 102 of FIG. 2A preferably differs from upper cover 102' of FIG. 8A in that upper cover 102' preferably extends down further along the length of the control assembly, thereby also covering isolation member 130' in addition to the controls and control panel 120'. Upper cover 102' may be a unitary body or may be made of two or more portions.

The aforementioned covers discussed in connection with FIGS. 2, 3 and 8 may be constructed of material that is substantially electrically non-conductive (e.g., plastic) and therefore substantially electrically isolates the respective components over which they are disposed, as well as protect them from external elements such as dust. For example, upper cover 102 or 102' substantially electrically isolates the control handles and control panel, as well as protect the control panel and its internal components (e.g., valves and fluid lines) from any unwanted external elements entering into the panel and potentially causing damage or unexpected electric connectivity. As another example, lower cover 132 of FIGS. 2 and 3 protects and provides further electric isolation to member 130, and disperses any hydraulic fluid that is leaking from the control panel away from the member. As for the embodiments depicted in FIGS. 8 and 9, a separate lower cover pertaining to isolation member 130' preferably does not exist. However, gasket 1333 may be included in isolation member 130' to ensure that any leaking hydraulic fluid does not run down the member 130' and potentially create any unwanted discharge paths.

Referring to either of FIG. 3 or FIG. 9, control panel 120 (or 120') is coupled to control handles (e.g., handles 111, 112, 113 and 114) and comprises an internal valve assembly and several fluid lines 124 (or '124) which direct hydraulic fluid into and out of control valves incorporated within the valve assembly. More specifically, as can be seen from FIGS. 2B and 3 (or FIGS. 8B and 9), the internal valve assembly in control panel 120 or 121') includes a main valve section 121 (or 121'), a selector valve section 123 (or 123'), a leveling relief valve section 125 (or 125'), and an auxiliary valve section 127 (or 127'). Each valve section may include one or more valves, each valve being associated with a pair of fluid lines 124 (or 124') and a control handle. Several pairs of fluid lines 124 (or 124') may couple a valve to isolation member 130 (or 130').

Isolation member 130 is interposed between fluid lines 124 and a set of fluid conduits (not shown) that extend from the control assembly towards material handling tools or towards a lower portion of the aerial lift, along the boom section depicted in FIG. 1. As discussed in more detail below, isolation member 130 is made of a material that is substantially electrically non-conductive and has a plurality of through-holes that allow hydraulic fluid to flow through the dielectric member into and out of the fluid lines and conduits. Therefore, isolation member 130 preferably substantially isolates all the elements disposed above isolation member 130 within control panel 120 (including fluid lines 124 and valve sections 121, 123 and 125) as well as control handles 111, 112, 113 and 114, from the elements disposed below isolation member 130 such as the conduits and boom section as well as the rest of the lower portion of the aerial lift that may be electrically connected to the ground. Furthermore, isolation member 130 preferably substantially isolates all the same elements disposed above isolation member 130 from material handling tools (e.g., a jib and/or winch) that may be attached to work platform 110. Similarly, isolation member 130' preferably: is interposed between fluid lines 124' and a set of fluid conduits that extend from the control assembly towards material handling tools or towards a lower portion of the aerial lift along the boom section; is made of a material that is substantially electrically non-conductive; has a plurality of through-holes that allow hydraulic fluid to flow through the dielectric member into and out of the fluid lines and conduits; and substantially isolates the elements disposed above it within control panel 120' (including fluid lines 124' and valve sections 121', 123' and 125'), as well as control handles and upper controls, from the elements disposed below isolation member 130' such as the conduits and boom section—as well as the rest of the lower portion of the aerial lift that may be electrically connected to the ground—and from material handling tools that may be attached to work platform 110. Accordingly, the upper controls or control handles which are manipulated by an operator, as well as other portions in the control assembly including the valves and fluid lines, can be considered to have high electrical resistance given, in part, that they are substantially electrically isolated from other contiguous portions in the control assembly, conduits, tools and/or boom section through isolation member 130 or 130'.

Referring back to control assembly 101 and the internal valve assembly in control panel 120 of FIGS. 2 and 3, main valve section 121 may include several valves, the majority of which may be coupled to control handles 111, 112 and 113 which control the position and movement of work platform 110 through boom/turret movements (e.g., extension/retraction, raising/lowering, rotation). The control handles may be manipulated by an operator and are preferably in the form of a linkage (e.g., a depressible and pivotal input device having a wide range of motions such as linkage 111) or levers (e.g., ones that can control opposite motions or functions such as levers 112 or 114, and/or ones that can have only two states such as lever 113). Given that the control handles are provided with high electrical resistance through isolation member 130, handles 111, 112 and 114 may be constructed from cost-effective material having sufficient structural strength and rigidity to withstand continuous manipulation by operators, which at least in part includes metal or other electrically conductive material. For example, control handles 111, 112, 113 and 114 may be constructed from steel. Similarly, the valves and fluid lines within control panel 120, which are also substantially electrically isolated through isolation member 130, may be constructed from cost-effective material with sufficient thermal and structural properties to withstand hydraulic fluid movement at varying conditions, which at least in part includes metal or other electrically conductive material. For example, the valve assembly (which includes valve sections 121, 123, 125 and 127 and the corresponding valves) may be constructed from cast iron. Similarly, fluid lines 124 may be hard lines constructed from steel. The same preferably applies to the controls, valve sections and fluid lines coupled to isolation member 130' of FIGS. 8 and 9.

Still referring to FIGS. 2 and 3, the subset of the control valves pertaining to main valve section 121 are coupled to at least three (and preferably four) pairs of fluid lines 124 disposed between main valve section 121 and isolation member 130. The number of valves in main valve section 121, as well as the number of pairs of fluid lines 124 disposed between main valve section and isolation member 130, depend on the number of functions that can be controlled through the upper assembly control handles, and the number of motions and moving components available on the aerial lift. As discussed above in connection with FIG. 1, the exemplary lift 100 may be provided with the following functions: platform clockwise/counterclockwise rotation and platform raising/lowering through levers 112; and boom raising/lowering as well as turret rotation through linkage 111. Depending on the type of linkage provided, linkage 111 may be used to control one or more booms—e.g., extension/retraction of (the inner boom of) upper boom 151, raising/lower of (the outer boom of) upper boom 151, and/or raising/lower of lower boom 152. One or more of the foregoing functions of linkage 111 (e.g., lower boom movement) may be implemented through an additional lever 112 (not shown), in which case, linkage 111 may have a smaller number of degrees of freedoms in which it can be moved/manipulated. The larger the number of functions provided, the larger the number of valves and associated fluid line pairs in control panel 120. Accordingly, a smaller number of functions/motions (hence valves and fluid lines) may be available for control in other lifts, such as ones in which the upper boom does not extend and/or only one boom may be raised/lowered. The same preferably applies to the valve sections and controls depicted in FIGS. 8 and 9, even though, for example, the control handles in these figures are not explicitly enumerated for simplicity and to avoid duplication.

Still referring to FIGS. 2 and 3, selector valve section 123 may include a selector valve which is coupled to main valve section 121 through one or more fluid lines, and which is coupled to isolation member 130 through a pair of fluid lines 124. Selector valve section may be controlled through lever 113, which may be referred to as a safety trigger for an emergency stop. By pressing on this safety trigger, an operator causes the selector valve to prevent the hydraulic fluid from flowing through main valve section 121 and instead diverts the fluid to the fluid tank (which is, e.g., located in pedestal 170 of FIG. 1) thereby stopping the main aerial lift functions in case of an emergency to prevent inadvertent operation. The same preferably applies to selector valve section 123' of FIGS. 8 and 9, which is coupled to main valve section 121' and isolation member 130'.

Still referring to FIGS. 2 and 3, leveling relief valve section 125 may include a leveling relief valve which is coupled to main valve section 121 through one or more fluid lines, and which is coupled to isolation member 130 through a pair of fluid lines 124. The level relief valve is used to limit hydraulic pressure in the leveling system. By preventing the hydraulic fluid from leaving the aforementioned master-slave cylinder circuit, leveling relief valve section 125 may automatically ensure that aerial platform 110 levels correctly. The same preferably applies to leveling relief valve section 125' of FIGS. 8 and 9, which is coupled to main valve section 121' and isolation member 130'.

Still referring to FIGS. 2 and 3, auxiliary valve section 127 may include several valves which may be coupled to control handles 114 which control certain tools (not shown). These tools may be removably attached to aerial work platform 110 and may fall into at least two categories of hydraulic tools: material handling tools such as a jib and winch, and hydraulically-powered tools such as a drill, a saw (including a chainsaw), impact tools (such as a driver), crimpers and other tools that can be stowed within side cover 122. For example, four handles 114 are illustrated in FIG. 3. The outer-most handle 114 may be coupled to one of the subset of the control valves pertaining to auxiliary valve section 127, which in turn may be coupled to a pair fluid lines 124 disposed between the auxiliary valve section and one or more fittings 129 to which the hydraulically-powered tool may be attached and controlled through the outer-most handle 114 and corresponding valve. The other inner three handles 114 may be coupled respectively to three control valves pertaining to auxiliary valve section 127, which in turn may be coupled to three pairs of fluid lines 124 disposed between auxiliary valve section 127 and isolation member 130. These three pairs of fluid lines 124 are preferably associated with functions pertaining to the material handling tools (e.g., jib and winch) coupled to aerial work platform 110 and controlled using inner three handles 114 and the corresponding control valves pertaining to auxiliary valve section 127. The functions pertaining to the material handling jib and winch which may be controlled through inner three handles 114 may include upwards/downwards articulation, extension/retraction and load raising/lowering. The same preferably applies to auxiliary valve section 127' and the corresponding controls and fluid lines coupled to isolation member 130' of FIGS. 8 and 9, even though, for example, the control handles in these figures are not explicitly enumerated for simplicity and to avoid duplication.

It should be noted that certain (non-material handing tools) used in aerial work platform 110 may be pneumatically—as opposed to hydraulically) powered. Examples of such air tools are drills or saws. In these situations, one or more control handles 114 may still be used to control such tools. However, these tools would require a separate pneumatic air supply line, which may be routed through isolation member 130 (or 130') and one of the through-holes therein, down to lower portions of the aerial lift.

The above discussion and corresponding drawings illustrate exemplary control assemblies of a work platform into which an isolation member may be integrated according to the principles of the invention. As mentioned above, the work platform is preferably coupled to a wheeled vehicle through a single or multi-section boom, which together make up the main components of an aerial lift whose functions may be controlled using hydraulic systems. Thus, the isolation member can be said to create and insulation gap that ensures that the control panel and handles of the platform are substantially electrically isolated from other portions of the aerial lift such as the fluid conduits, the boom section(s) along which they extend, and any tools attached to the platform. That being said, it is worth noting that the isolation member may be used in any work platform (whether aerial or not, whether coupled to a vehicle or not) where it is desirable to substantially electrically isolate the controls of the platform from other portions that may be in direct or indirect physical contact with the ground. For example, the isolation member may also be used as part of the lower control assembly of an aerial work platform to substantially isolate the control handles from other portions of the lift and vehicle. The following discussion focuses on the isolation member itself and various embodiments thereof.

Figure 4:
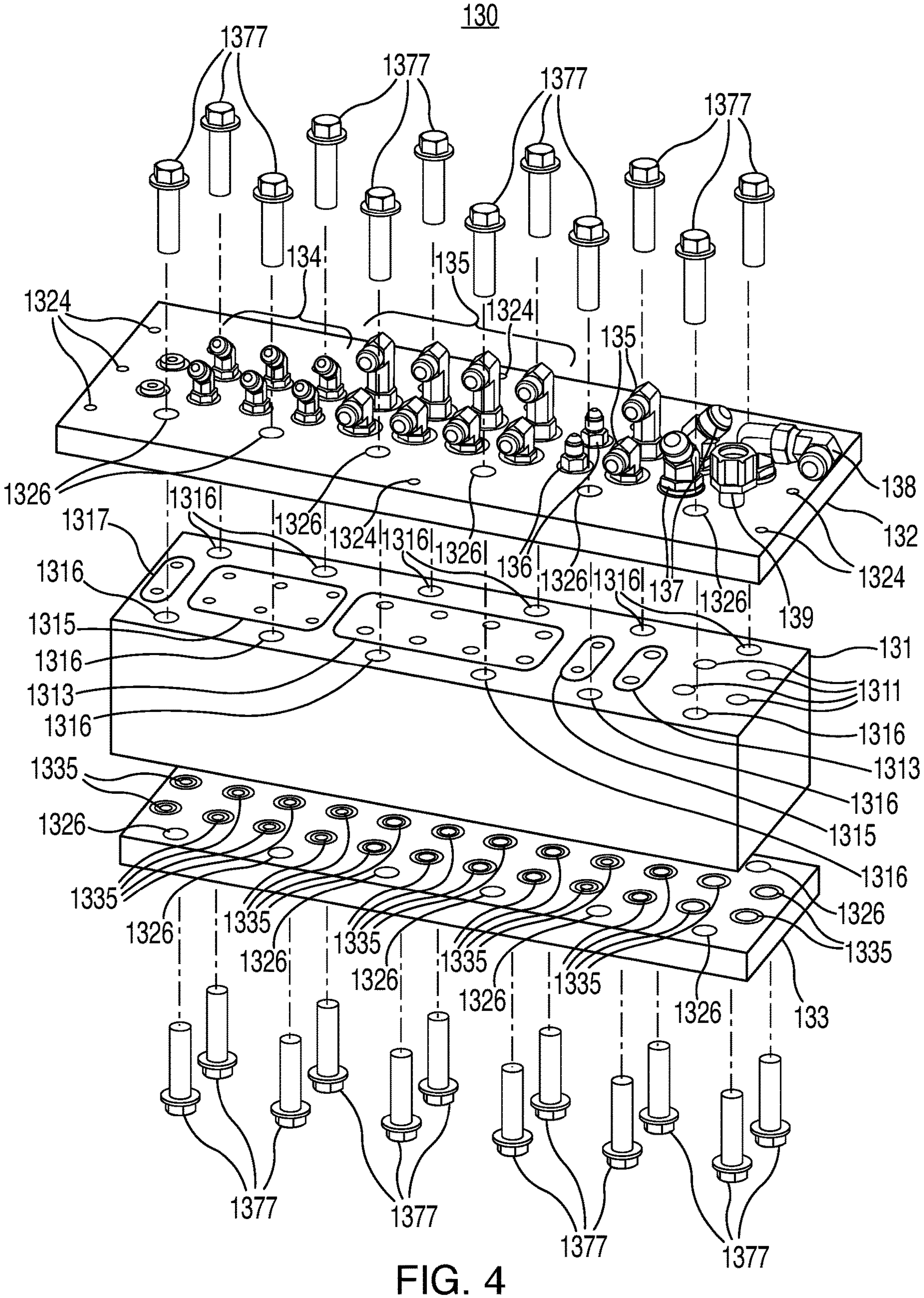
FIG. 4 is an exploded view of the isolation member in accordance with certain embodiments.
Figure 5:
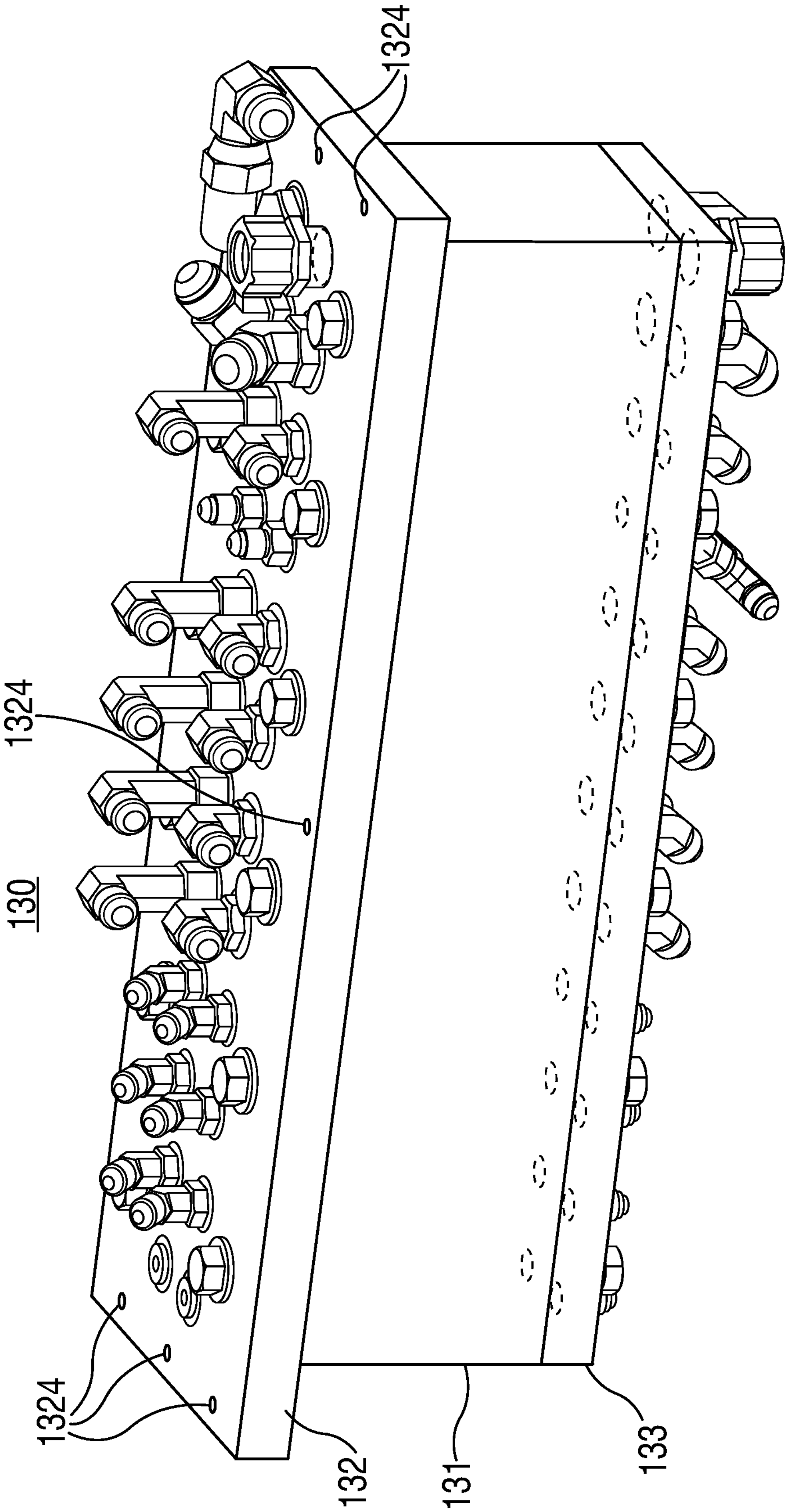
FIG. 5 is a perspective view of the isolation member in accordance with certain embodiments.

Referring to FIG. 4, an exemplary isolation member 130 is depicted through an exploded view showing the various components that make up the member according to certain embodiments. The member depicted in FIG. 4 may correspond to the one illustrated in FIGS. 2-3, except that the bottom fittings shown in FIGS. 2A and 2B are not depicted in FIG. 4 (for simplicity, FIG. 4 shows the top-side fittings only). FIG. 5 is a perspective view illustrating an assembled version of the isolation member of FIG. 4 would (including the bottom-side fittings).

Isolation member 130 of FIGS. 4-5 may mainly include a dielectric manifold 131, a pair of plates 132 and 133, bolts 1377 and multiple fittings (e.g., elements 134-139). Manifold 131 is constructed from a material that is substantially electrically non-conductive material. The material from which manifold 131 is constructed of material that may not be capable of conducting any electrical current or that may conduct very little electrical current under certain conditions (e.g., no more than 400 microamperes at 40 kV AC and/or no more than 56 microamperes at 56 kv DC). A variation of the isolation member is also shown in FIG. 6 (see isolation member 1300 having manifold 1310) which is discussed in further detail below and which is constructed from material that may not be capable of conducting any electrical current or that may conduct very little electrical current under certain conditions.

Figure 10:
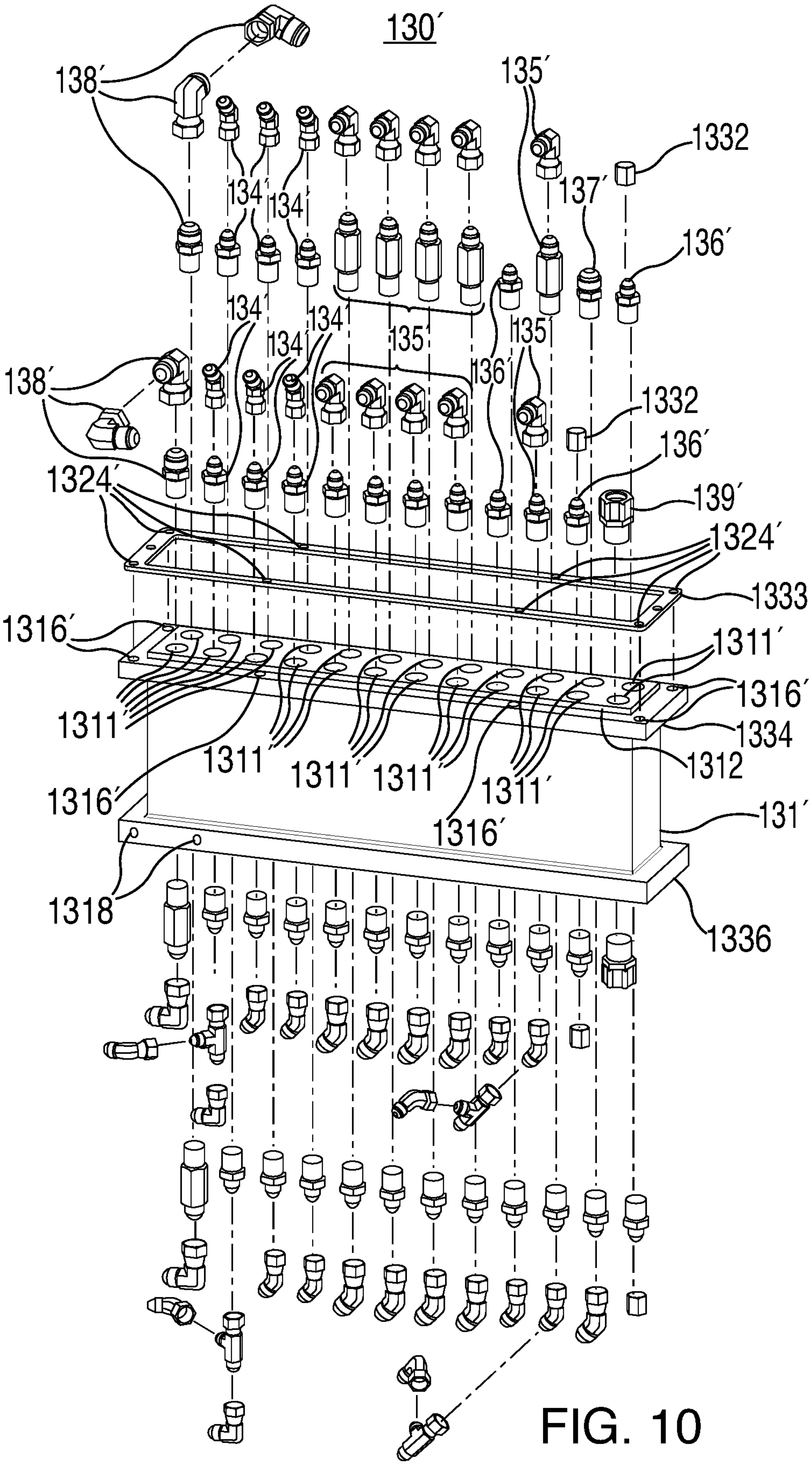
FIG. 10 is an exploded view of the isolation member in accordance with yet other embodiments.

Similarly, an exemplary isolation member 130' is depicted in FIG. 10 through an exploded view showing the various components that make up the member according to other embodiments. The member depicted in FIG. 10 may correspond to the one illustrated in FIGS. 8-9, except that hose clamp 832 is not depicted in FIG. 10. Similar to member 130, isolation member 130' of FIG. 10 may mainly include a dielectric manifold 131' constructed from a material that is substantially electrically non-conductive material, as well as multiple fittings (e.g., elements 134'-139'). Unlike member 130, isolation member 130' does not include plates (nor bolts which would otherwise attach the plates to the manifold). Again, manifold 131' may be constructed of material that may not be capable of conducting any electrical current or that may conduct very little electrical current under certain conditions (e.g., no more than 400 microamperes at 40 kV AC and/or no more than 56 microamperes at 56 kv DC).

Figure 6:
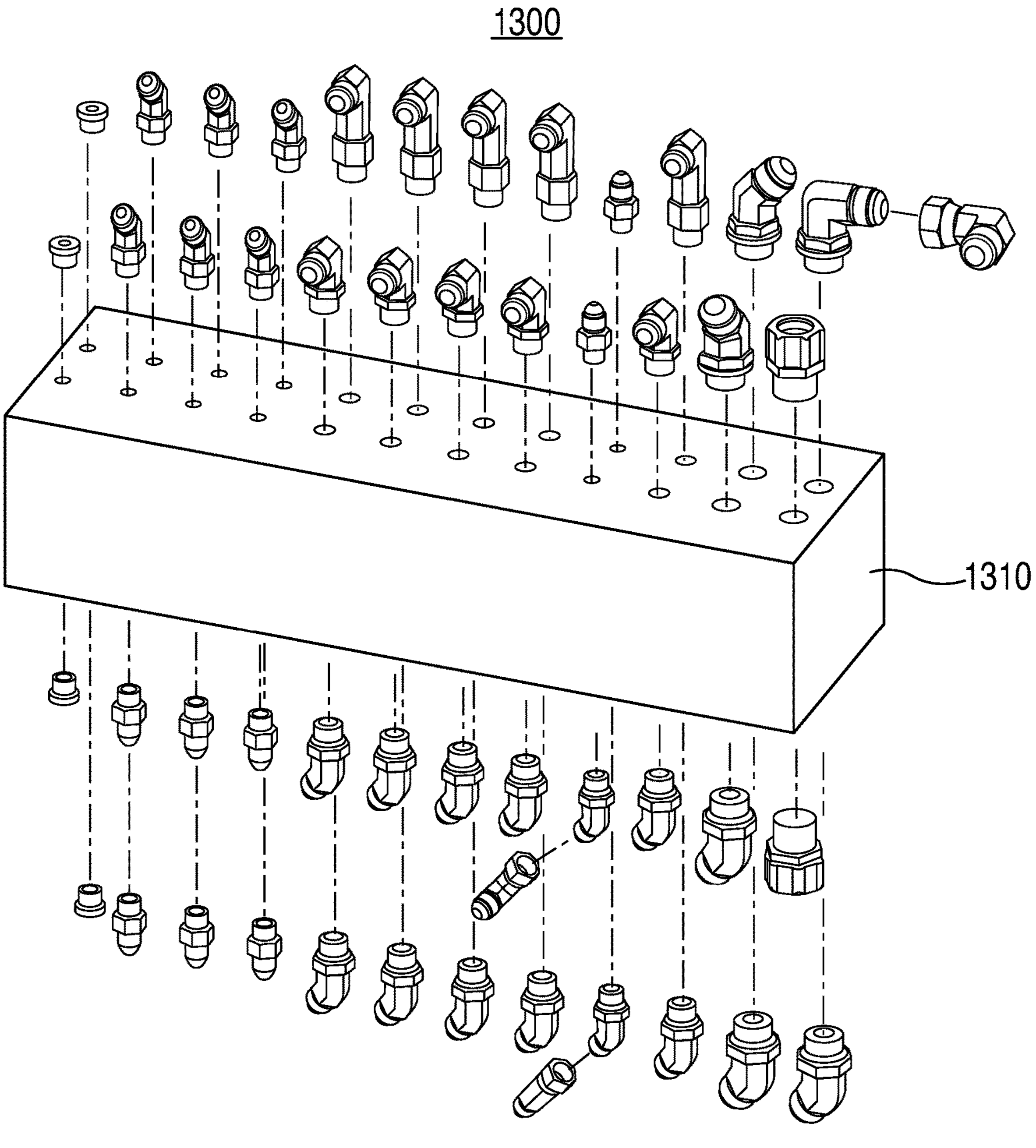
FIG. 6 is an exploded view of the isolation member in accordance with other embodiments.

With respect to either isolation member 130 of FIG. 4, isolation member 1300 or FIG. 6 or isolation member 130' of FIG. 10, the top-side fittings couple the isolation member to the fluid lines in the control panel, thereby directing flow of the hydraulic fluid from the fluid lines into and out of the isolation member, whereas the bottom-side fittings couple the isolation member to the fluid conduits which either extend along the lift's boom section towards the lower portion of the aerial lift or are coupled to material handing tools attached to the platform (e.g., a jib and/or winch), thereby directing flow of the hydraulic fluid from the fluid conduits into and out of the isolation member. As also mentioned above, hydraulic fluid flows through the valve sections in the control panel, through the fluid lines, through the isolation member and through the fluid conduits towards and back from a lower portion of the aerial lift (or the material handling tools) in order to translate control inputs from the handles into corresponding component movement that enables the platform and tools to operate as desired.

Manifold 131 of FIG. 4 is preferably generally in the shape of a polyhedron having at least top and bottom faces. For example, as can be seen from the drawings, manifold 131 is substantially in the shape of a cuboid having six faces including a top face and a parallel bottom face. Bolts 1377 (each of which may be provided with a helicoil) secure the plates to manifold 131. The top face of manifold 131 includes blind holes 1316 which line up with through-holes 1326 of upper plate 132 in order to permit bolts 1377 which are shown in the top part of FIG. 4 to be inserted through the plate and manifold to secure them together and hold plate 132 flush against the top face of manifold 131. Although not shown, the bottom face of manifold 131 also includes blind holes which line up with through-holes 1326 of lower plate 133 in order to permit bolts 1377 which are shown in the bottom part of FIG. 4 to be inserted through the plate and manifold to secure them together and hold plate 133 flush against the bottom face of manifold 131. Thus, each one of plates 132 and 133 may be provided with through-holes 1326 which line up with blind holes disposed on manifold 131 and through which upper bolts 1377 are inserted in order to connect plates 132 and 133 to manifold 131.

Similarly, manifold 1310 of FIG. 6 or manifold 131' of FIG. 10 are preferably generally in the shape of a polyhedron. For example, as can be seen from the drawings, manifold 1310 is substantially in the shape of a cuboid having six faces including a top face and a parallel bottom face. As for manifold 131', it may be slightly more distinct in that it may additionally have at least top and bottom flanges 1334 and 1336. In addition, gasket 1333 may be included to ensure that any leaking hydraulic fluid does not run down the member 130' and potentially create any unwanted discharge paths.

Manifold 131, 1310 or 131' may be molded, cast and/or machined from a dielectric material, such as thermoplastic material, a thermosetting plastic material, a fibre-reinforced plastic material or any other plastic, ceramic or glass material having favorable properties discussed below. It is preferable to use cost-effective, machinable material having desirable tensile strength, elasticity and hardness, in addition to thermal and dielectric properties that meet ANSI standards For example, manifold 131 may be in the form of a block made of an engineering plastic material. Manifold 131, 1310 and/or 131' may be a solid piece of thermoplastic material. The thermoplastic material that makes up manifold 131, 1310 and/or 131' is preferably a nylon plastic. In other embodiments, manifold 131, 1310 and/or 131' may be a solid piece of thermosetting plastic material. Manifold 131, 1310 and/or 131' may be a solid piece of fibre-reinforced plastic material. The fibre-reinforced plastic material that makes up manifold 131, 1310 and/or 131' may be a glass-fibre-reinforced polymer, a carbon-fibre-reinforced polymer, or an aramid-fibre-reinforced polymer. For example, the fibre-reinforced plastic material may be fiberglass, Kevlar (a para-aramid synthetic fiber material), etc. Alternatively, manifold 131, 1310 and/or 131' may constructed from glass or other dielectric polymers. Manifold 131, 1310 and/or 131' may be constructed from any material that is substantially electrically non-conductive and that has appropriate long-term thermal and structural properties so as to withstand constant hydraulic fluid flow at a rate of around 6 gpm, pressure around 3000 psi, but up to 6000 psi and higher (such as 8000 or even 9000 psi) and temperatures ranging between −40° F. and 200° F. This is to enable hydraulic fluid to flow effectively and stably through a plurality of through-holes that extend from the bottom face to the top face of the manifold, under various operating conditions. In addition, the material should have sufficient UV and/or creep resistance, as well as chemical resistance to hydraulic fluid such as any hydraulic oils used in aerial lift systems. Manifold 131, 1310 and/or 131' preferably satisfies ANSI Standard A92.2.

The through-holes in each one of manifold 131, 1310 and/or 131' are depicted in FIGS. 4, 6 and 10. These through-holes may be disposed in pairs and extend from the bottom face to the top face of the manifold so as to allow hydraulic fluid to flow through the manifold. The through-holes may be drilled into the manifold or otherwise created while the manifold is machined. Alternatively, the through-holes may be cast as part of the manifold, if that is how the manifold is constructed. Moreover, with respect to manifold 131 of FIG. 4, these through-holes preferably line up with a series of openings in plates 132 and 133 into which various fittings may be inserted (e.g., screwed). The inner side of each opening 1335 on plates 132 and 133 may be provided with an O ring to prevent any hydraulic fluid leakage.

With respect to manifold 131 or 1310, the through-holes may have different sizes depending on the diameter of the hose (e.g., fluid line or conduit) through which the hydraulic fluid is intended to flow in and out of the manifold. Similarly, the openings in plates 132 and 133 of manifold 131 may each have a diameter that corresponds to the diameter of the through-hole in manifold 131 with which the opening lines up. To create the openings in plates 132 and 133, several screw holes of different diameters may be machined at the surface of each plate. In other embodiments that make the manifold easier to manufacture and versatile, most through-holes may have the same size, and the fittings that are coupled thereto may be adapted such that the size of the side of the fitting that is inserted into the through-hole corresponds to the through-hole size, whereas the size of the side of the fitting to which the hose connects is different depending on the diameter of the hose.

More specifically, with respect to isolation member 130 of FIG. 4, manifold 131 may have, for example, two pairs of through-holes 1311 having about a ½" diameter to supply and return hydraulic fluid through fittings one of fittings 137 and fitting 138 to the fluid lines 124 and the corresponding valve sections in the control assembly 120 of FIGS. 2B and 3. More specifically, hydraulic fluid supplied from the tank in the pedestal (e.g., element 170 of FIG. 1) through conduits which are routed through the boom section (e.g., element

150 of FIG. 1) is directed through one of the fittings disposed on plate 133 into one of through-holes 1311 of manifold 131, and is directed through one of fittings 137 disposed on plate 132 into one of the fluid lines 124, which in turn supplies the hydraulic fluid to selector valve section 123, and subsequently to main valve section 121 and auxiliary valve section 127 of FIG. 3. Similarly, the hydraulic fluid returns from the different valve sections through the corresponding fluid line 124 coupled to both main and auxiliary valve sections, and disposed between them and the isolation member, through fitting 138 which is disposed on plate 132 and which is coupled to that fluid line. This particular fitting 137 directs the fluid into one of through-holes 1311 in manifold 131 which is aligned with the fitting, and the fluid is directed through another aligned fitting disposed on plate 133 into the corresponding conduit, which in turn routes the fluid back down to the fluid tank.

When an emergency stop is triggered through lever 113 of FIG. 3, the hydraulic fluid that would normally flow from the selector valve to the main and auxiliary valves is directed through selector valve section 123 and one of the corresponding fluid lines 124 disposed between the selector valve and the isolation member to the other one of fittings 137 disposed on plate 132, which in turn directs the fluid into one of through-holes 1311 of manifold 131, and the fluid is directed through one of the fittings disposed on plate 133 into the conduits routed through the boom section, thereby diverting the fluid to the tank.

Certain fittings, such as fitting 139 disposed on plate 132 (and a corresponding one disposed on plate 133), may be referred to as a strain relief fitting. Through such fittings and the corresponding through-hole 1311 that aligns with them, an air line (such as one used to power pneumatic tools discussed above) and/or a fiber-optic line (in case additional signals—such as start/stop engine commands—need to be comminuted to lower components or portions of the aerial lift) may be routed. To avoid creating a discharge path, this particular through-hole may be partially filled with non-conductive material such as silicone.

Manifold 131 of FIG. 4 may have several pairs of through-holes 1313, each having about a ⅜" diameter to supply and return hydraulic fluid through fittings 135 to the main valve section 121 (through corresponding fluid lines 124) in the control assembly 120 of FIGS. 2B and 3 and to conduits that direct the fluid to the appropriate cylinder or motor in the aerial lift that controls the position and movement of work platform 110 through boom/turret movements (e.g., extension/retraction, raising/lowering, rotation). For example, when handle or linkage 111 is actuated in order to rotate turret 161 of FIG. 1, hydraulic fluid flows from main valve section 121, through the corresponding fluid line 124 disposed between the main valve associated with turret rotation and the isolation member through one of fittings 135 which is disposed on plate 132 and which is coupled to that fluid line. This particular fitting 135 directs the fluid into one of through-holes 1313 in manifold 131 which is aligned with the fitting, and the fluid is directed through another aligned fitting disposed on plate 133 into the corresponding conduit routed through the boom section, which in turn provides the fluid to a rotation motor, thereby causing turret 161 to rotate (e.g., clockwise depending on the function triggered using handle 111) in order to rotate the aerial assembly, including platform 110. Hydraulic fluid may flow back from motor through the other conduit, fitting, through-hole and fluid line, which are part of the same pair of conduit, fitting, through-hole and fluid line through which the fluid flow was initiated in response to the triggered action, back to main valve section 121. If the opposite motion is triggered by actuating handle 111 (e.g., rotating the turret counterclockwise as opposed to clockwise), then the flow described above is reversed (i.e., the fluid flows in the opposite direction through the same components).

As another example, when handle or linkage 111 is actuated in order to extend/retract (the inner boom of) upper boom 151, raise/lower (the outer boom of) upper boom 151 and/or raise/lower lower boom 152 of FIG. 1, hydraulic fluid flows from main valve section 121, through the corresponding fluid line(s) 124 disposed between the main valve associated with the particular type of movement control and the isolation member through fitting(s) 135 disposed on plate 132, which in turn directs the fluid into through-hole(s) 1313 of manifold 131, and the fluid is directed through fitting(s) disposed on plate 133 into the conduits routed through the boom section, which in turn provide(s) the fluid to the corresponding cylinder(s) (such as lower boom or upper boom cylinders of 155/145 of FIG. 1 or an extension cylinder or rotation motor), thereby causing the desired function corresponding to the actuated handle to be performed. Hydraulic fluid may flow back from the cylinder or motor through the other conduit(s), fitting(s), through-holes(s) and fluid line(s), which are part of the same pair of conduit(s), fitting(s) through-hole(s) and fluid line(s) through which the fluid flow was initiated in response to the triggered action(s), back to main valve section 121. If the opposite motion is triggered by actuating handle 111 (e.g., raising one of the booms as opposed to lowering it), then the flow described above is reversed (i.e., the fluid flows in the opposite direction through the same components).

One of pairs of through-holes 1313 shown in FIG. 4 may be associated with the function of one of levers 112 of FIG. 3 which controls platform rotation. More specifically, when this lever 112 is actuated in order to rotate work platform 110, hydraulic fluid flows from main valve section 121, through the corresponding fluid line 124 disposed between the main valve associated with platform rotation and the isolation member through one of fittings 135 which is disposed on plate 132 and which is coupled to that fluid line. This particular fitting 135 directs the fluid into one of through-holes 1313 in manifold 131 which is aligned with the fitting, and the fluid is directed through another aligned fitting disposed on plate 133 into a corresponding conduit, which in turn provides the fluid to a rotator, thereby causing work platform 110 to rotate by itself (e.g., clockwise depending on the function triggered using lever 112). Hydraulic fluid may flow back from the rotator through the other conduit, fitting, through-hole and fluid line, which are part of the same pair of conduit, fitting, through-hole and fluid line through which the fluid flow was initiated in response to the triggered action through lever 112, back to main valve section 121. Again, if the opposite motion is triggered by actuating lever 112 (e.g., rotating the platform counterclockwise as opposed to clockwise), then the flow described above is reversed (i.e., the fluid flows in the opposite direction through the same components).

Manifold 131 of FIG. 4 may have several pairs of through-holes 1315, each having about a ¼" diameter to supply and return hydraulic fluid to either the main valve section 121 (through fittings 136, level relief valve section 125 and corresponding fluid lines 124), or the auxiliary valve section 127 (through fittings 134 and corresponding fluid lines 124) in the control assembly 120 of FIGS. 2B and 3. Similarly, through-holes 1315 which align with fittings 136 disposed on plate 132 as well as corresponding fittings disposed on plate 133, may supply and return hydraulic fluid to conduits which extend along the boom section and direct the fluid to a master-slave cylinder circuit in order to ensure that the aerial work platform 110 is level using, at least in part, one of levers 112 which controls platform leveling and/or leveling relief valve section 125. Finally, through-holes 1315 which align with fittings 134 disposed on plate 132 as well as corresponding fittings disposed on plate 133, may supply and return hydraulic fluid to conduits which extend towards material handling tools (e.g., a jib and/or winch) that may be attached to work platform 110 in order to control functions pertaining to the tools (e.g., upwards/downwards articulation, extension/retraction and load raising/lowering) using inner three levers 114.

Manifold 131 of FIG. 4 may have at least one additional pair of through-holes 1317, which may be used to supply and return hydraulic fluid for any other control function not discussed herein. For example, certain aerial lifts may be capable of providing for platform elevation, in which case, through-holes 1317 and corresponding fittings, fluid lines and valves may be provided to enable such functionality through the control assembly. Alternatively, one or both through-holes 1317 may be used to supply air to be used in connection with pneumatic tools discussed above.

It should be noted that any through-holes (and corresponding plate openings with which the through-holes align) that are not in use in a particular aerial lift may be left unconnected or coupled to any fitting, conduit or fluid line. Alternatively, a nominal screw and/or cap may be inserted into the plate opening, the through-hole or the fitting that connects to this through-hole to prevent any fluid or other substance from leaking or falling therefrom, or being trapped therein. In yet other embodiments, the unused through-hole may be filled in part (e.g., at each end) with non-conductive material such as silicone while keeping part of hole empty in order to maintain the insulation gap.

Moreover, certain aerial lifts may not have as many functions and components as described in connection with FIGS. 1-3. For example, certain lifts may not have an extendable boom or, may only have one boom. Accordingly, the main controls and corresponding valves and fluid lines may be smaller in number than the ones illustrated in FIG. 3. Other control assemblies may not be outfitted with any auxiliary controls (such as handles 114 which can be used to manipulate tools). In these situations, certain fittings to which conduits or fluid lines would have otherwise been connected may remain uncoupled. Alternatively, nominal screws and/or caps may be inserted into the plate openings, the through-holes or the fittings that connects to the through-holes that would have otherwise had fluid flow through them. In yet other embodiments, the unused through-hole may be filled in part (e.g., at each end) with non-conductive material such as silicone. Because isolation member 130 may have sufficient channels to handle any number of functionalities, some of which can safely be not used, isolation member 130 may be usable in any control assembly provided on aerial lifts. In other words, isolation member 130 may be a one-size-fits all device, and there would be no need to manufacture multiple types of various sizes and numbers of through-holes.

Given that manifold 131, which is constructed from material that is substantially electrically non-conductive material, is disposed or sandwiched between two plates that are not in contact with each other, manifold 131 substantially isolates plates 132 and 133 from each other. Accordingly, the plates may be constructed from cost-effective, light-weight material with sufficient thermal and structural properties to withstand hydraulic fluid movement, and may at least in part include metal or other electrically conductive material. For example, each one of plates 132 and 133 may be constructed from aluminum. Alternatively, they may be constructed from steel or other metal.

As can be seen in FIGS. 4 and 5, although plates 132 and 133 may have a similar if not identical thickness, plate 132 may be larger than plate 133. More specifically, the length and/or width—hence the surface area—of plate 132 may extend beyond those of plate 133. For example, plate 133 may have a length and width that are substantially equal to those of manifold 131. Plate 132, on the other hand may be longer and wider so that its surface area can accommodate additional screw holes 1324. These screw holes may be for affixing isolation member 130 to a bottom portion of control assembly 120 as shown in FIGS. 2B and 3. In addition, some of these screw holes may be for affixing a cover for the isolation member such as lower cover 132 shown in FIGS. 2A and 3. In other embodiments, plate 132 (and/or 133) may have a length and/or width that are smaller to those of manifold 131 to improve the dielectric properties associated with isolation member 130.

In the embodiment shown in FIGS. 4-5, the dielectric manifold is sandwiched between two aluminum plates, the top one of which serves to attach the isolation member to the control assembly. However, in other embodiments, such as the one shown in FIG. 6, the dielectric manifold may not have any plates. Instead, the fittings are preferably coupled (e.g., screwed) directly into manifold 1310 to make up isolation member 1300. Isolation member 1300 may be held together with the assembly by the top fittings alone shown in FIG. 6, when coupled to the fluid lines in the control panel of the assembly. Preferably, a top portion of the manifold may include tapped holes (not shown) for affixing the manifold to a bottom portion of the upper control assembly through mounting brackets bolted into the control panel.

In the embodiment depicted in FIG. 6, the through-holes provided in manifold 1310 may be the same as the ones discussed above in connection with manifold 131 in many respects. They may be disposed in pairs and extend from the bottom face to the top face of manifold 1310 so as to allow hydraulic fluid to flow through the manifold, and have the same diameters. They may be drilled into manifold 1310 or otherwise created while manifold 1310 is machined. Alternatively, the through-holes may be cast as part of the manifold, if that is how the manifold is constructed. Fluid flow in and out of manifold 1310 may operate similar to as described in connection with FIG. 4 to control certain functions of the aerial lift.

As an example, when handle or linkage 111 of FIG. 3 is actuated in order to rotate turret 161 of FIG. 1, hydraulic fluid flows from main valve section 121, through the corresponding fluid line 124 disposed between the main valve associated with turret rotation and isolation member 1300 through one of the top-side fittings shown in FIG. 6 which is coupled to that fluid line. This particular fitting directs the fluid into one of the through-holes in manifold 1310 to which the fitting is coupled on the top face of member 1300, and the fluid is directed through one of the bottom-side fittings which is coupled on the bottom face of member 1300 into the corresponding conduit routed through the boom section, which in turn provides the fluid to a rotation motor, thereby causing turret 161 of FIG. 1 to rotate (e.g., clockwise depending on the function triggered using handle 111) in order to rotate the aerial assembly, including platform 110. Hydraulic fluid may flow back from motor through the other conduit, fitting, through-hole and fluid line, which are part of the same pair of conduit, fitting, through-hole and fluid line through which the fluid flow was initiated in response to the triggered action, back to main valve section 121. If the opposite motion is triggered by actuating handle 111 (e.g., rotating the turret counterclockwise as opposed to clockwise), then the flow described above is reversed (i.e., the fluid flows in the opposite direction through the same components).

As mentioned above, in certain embodiments, several through-holes may have the same size, whereby the fittings that are coupled thereto may be adapted such that the size of the side of the fitting that is inserted into the through-hole corresponds to the through-hole size, whereas the size of the side of the fitting to which the hose (e.g., the fluid line or the conduit) connects is different depending on the diameter of the hose. This may be the case for manifold 131' of isolation member 130 of FIG. 10. More specifically, through-holes 1311' in manifold 131' may have a ⅜" diameter. A fitting may be inserted (e.g., screwed) into the through-hole from each side of the through-hole such that a fitting is coupled to the top face of member 130' and can be in turn coupled to a fluid line in control assembly 120' of FIG. 8B, while another fitting is coupled to the bottom face of member 130' and can be in turn coupled to a fluid conduit that extends down towards the boom section. While the fittings that are coupled to the top face of member 130' are enumerated in FIG. 10 (see items 134'-139'), the corresponding fittings that are coupled to the bottom face of member 130' are not enumerated for simplicity in FIG. 10.

Each one of fittings 134'-138' may be made up of two or more components—a first component that is inserted into the corresponding through-hole 1311' and a second or more components that screws onto the first and is connected to the fluid hose. A strain relief fitting 139' may be coupled to one or more through-holes in manifold 131' (e.g., through-hole 1312) which may have a larger diameter (e.g. about ½") in order to accommodate one or more air line(s) (such as one used to power pneumatic tools discussed above), fiber-optic line(s) (in case additional signals—such as start/stop engine commands—need to be comminuted to lower components or portions of the aerial lift), etc. Again, to avoid creating a discharge path, this particular through-hole may be partially filled with non-conductive material such as silicone.

Each one of fittings 134'-138' preferably supplies and returns hydraulic fluid to the fluid lines 124' and the corresponding valve sections in the control assembly 120' of FIGS. 8B and 9. Hydraulic fluid supplied from the tank in the pedestal (e.g., element 170 of FIG. 1) through conduits which are routed through the boom section (e.g., element 150 of FIG. 1) is directed through one of the fittings inserted into one of through-holes 1311' of manifold 131', and is directed through fitting 137' into one of the fluid lines 124, which in turn supplies the hydraulic fluid to selector valve section 123', and subsequently to main valve section 121' and auxiliary valve section 127'. Similarly, the hydraulic fluid returns from the different valve sections through the corresponding fluid line 124' coupled to both main and auxiliary valve sections, and disposed between them and the isolation member, through one of fittings 138' which is coupled to that fluid line and to isolation member 130'. This particular fitting 138' directs the fluid into one of through-holes 1311' in manifold 131 which is aligned with the fitting, and the fluid is directed through another aligned fitting disposed on the bottom of manifold 131' into the corresponding conduit, which in turn routes the fluid back down to the fluid tank.

When an emergency stop is triggered (e.g., through lever 113), the hydraulic fluid that would normally flow from the selector valve section 123' to the main and auxiliary valve section 121' and 127' is directed through selector valve section 123' and one of the corresponding fluid lines 124 disposed between the selector valve and the isolation member to the other one of fittings 138', which in turn directs the fluid into one of through-holes 1311' of manifold 131', and the fluid is directed through one of the fittings disposed on the bottom of manifold 131' into the conduits routed through the boom section, thereby diverting the fluid to the tank.

When a main control (e.g., a handle 112 or linkage 111) is actuated in order to perform a function, hydraulic fluid flows from main valve section 121', through the corresponding fluid line 124' disposed between the main valve associated with that function and the isolation member, and through one of fittings 135' which is coupled to that fluid line and member 130'. This particular fitting 135' directs the fluid into one of through-holes 1311' in manifold 131' which is aligned with the fitting, and the fluid is directed through another aligned fitting disposed on the bottom of manifold 131' into the corresponding conduit routed through the boom section, which in turn provides the fluid to a motor or cylinder associated with the function pertaining to the actuated control. Hydraulic fluid may flow back from the motor or cylinder motor through the other conduit, fitting, through-hole and fluid line, which are part of the same pair of conduit, fitting, through-hole and fluid line through which the fluid flow was initiated in response to the triggered action, back to main valve section 121'. As before, if the opposite motion is triggered, then the flow described above is reversed (i.e., the fluid flows in the opposite direction through the same components). Exemplary functions associated with such flow may be rotate work platform 110 clockwise/counterclockwise, extend/retract (the inner boom of) upper boom 151, raise/lower (the outer boom of) upper boom 151, and/or raise/lower lower boom 152 of FIG. 1.

One or more (e.g., two) pairs of fittings 136' may be disposed on the top side of isolation member 130' of FIG. 10. One such pair of fittings may similarly supply and return hydraulic fluid through corresponding through-holes 1311' of manifold 131' to the main valve section 121' (through level relief valve section 125' and corresponding fluid lines 124) in the control assembly 120' of FIGS. 8B and 9. A corresponding pair of fittings 136' disposed on the bottom side of isolation member 130' may supply and return hydraulic fluid to conduits which extend along the boom section and direct the fluid to a master-slave cylinder circuit in order to ensure that the aerial work platform 110 is level. Similarly, one or more (e.g., three) pairs of fittings 134' may be disposed on the top side of isolation member 130'. One such pair of fittings may similarly supply and return hydraulic fluid through corresponding through-holes 1311' of manifold 131' to the auxiliary valve section 127' (through corresponding fluid lines 124) in control assembly 120'. A corresponding pair of fittings 134' disposed on the bottom side of isolation member 130' may supply and return hydraulic fluid to conduits may supply and return hydraulic fluid to conduits which extend towards material handling tools (e.g., a jib and/or winch) that may be attached to the work platform 110 in order to control functions pertaining to the tools (e.g., upwards/downwards articulation, extension/retraction and load raising/lowering) using, e.g., inner three levers 114.

Finally, one or more pairs of fittings 136' may be disposed on the top side of isolation member 130', with corresponding fittings disposed on the bottom side, in order to supply and return hydraulic fluid for any other control function not discussed herein. For example, certain aerial lifts may be capable of providing for platform elevation, in which case, these fittings and corresponding through-holes 1311', fluid lines and valves may be provided to enable such functionality through the control assembly. Alternatively, if these fittings are not used to conduct hydraulic fluid or for any other function, then nominal screws and/or caps (such as fittings 1332) may be coupled to these fittings.

The opening of each one of fittings 134'-138' may be tapered such that the side of the fitting that is inserted into through-hole 1311' has about a ⅜" diameter corresponds to the through-hole size, whereas the diameter of the side of the fitting to which the fluid line or conduit connects corresponds to that of the line or conduit. For example, the side of fitting 138' or 137' which connects to a fluid line/conduit may have about a ½" diameter. As another example, the side of fitting 135' which connects to a fluid line/conduit may have about a ⅜" diameter. As yet another example, the side of fitting 136' or 134' which connects to a fluid line/conduit may have about a ¼" diameter.

Much like manifold 1310 of FIG. 6, manifold 131' of FIG. 10 may not be sandwiched by a pair of plates. Manifold 131', however, may include one or more flanges, such as flange 1334 and/or flange 1336. Each one of these flanges may be provided in order to provide additional room on the isolation member to attach the member to other portions of work platform or to attach the additional components to the member. More specifically, flange 1334 may be machined or cast from the same material making up manifold 131' and may include screw holes 1316' for affixing isolation member 130' to a bottom portion of control assembly 120' as shown in FIGS. 8B and 9. Flange 1336 may be machined or cast from the same material making up manifold 131' and may include holes 1318 for affixing (e.g., bolting) hose clamp 832 to a bottom portion of isolation member 130' as shown in FIGS. 8B and 9. Alternatively, the length and/or width—hence the surface area—of either or both faces of manifold 131' may be increased so as to accommodate any of these additional holes.

Gasket 1333 which may be part of isolation member 130' may sit on top of flange 1334 around the periphery of manifold 131' and has screw holes 1324' which line up with screw holes 1316' of flange 1334 in order to permit screws to be inserted through the plate and flange to secure them together and to control assembly 120' as shown in FIGS. 8B, 9 and 10. As can be seen, the upper face of manifold 131' may protrude above flange 1334 and the bottom part of control assembly 120' in order to allow contaminants and/or leaking hydraulic fluid to flow off isolation member 130' and keep its surface cleaner.

Hose clamp 832 may be bolted to one side of isolation member along flange 1336 in order to secure the fluid conduits (not shown) which extend from control assembly 120' towards other portions of the aerial lift, and prevent them from making direct contact with other portions of control assembly 120' and/or the work platform (e.g., the outside surface of the bucket) near the control assembly in order to further avoid creating any additional unwanted electrical discharge paths.

Figure 7:
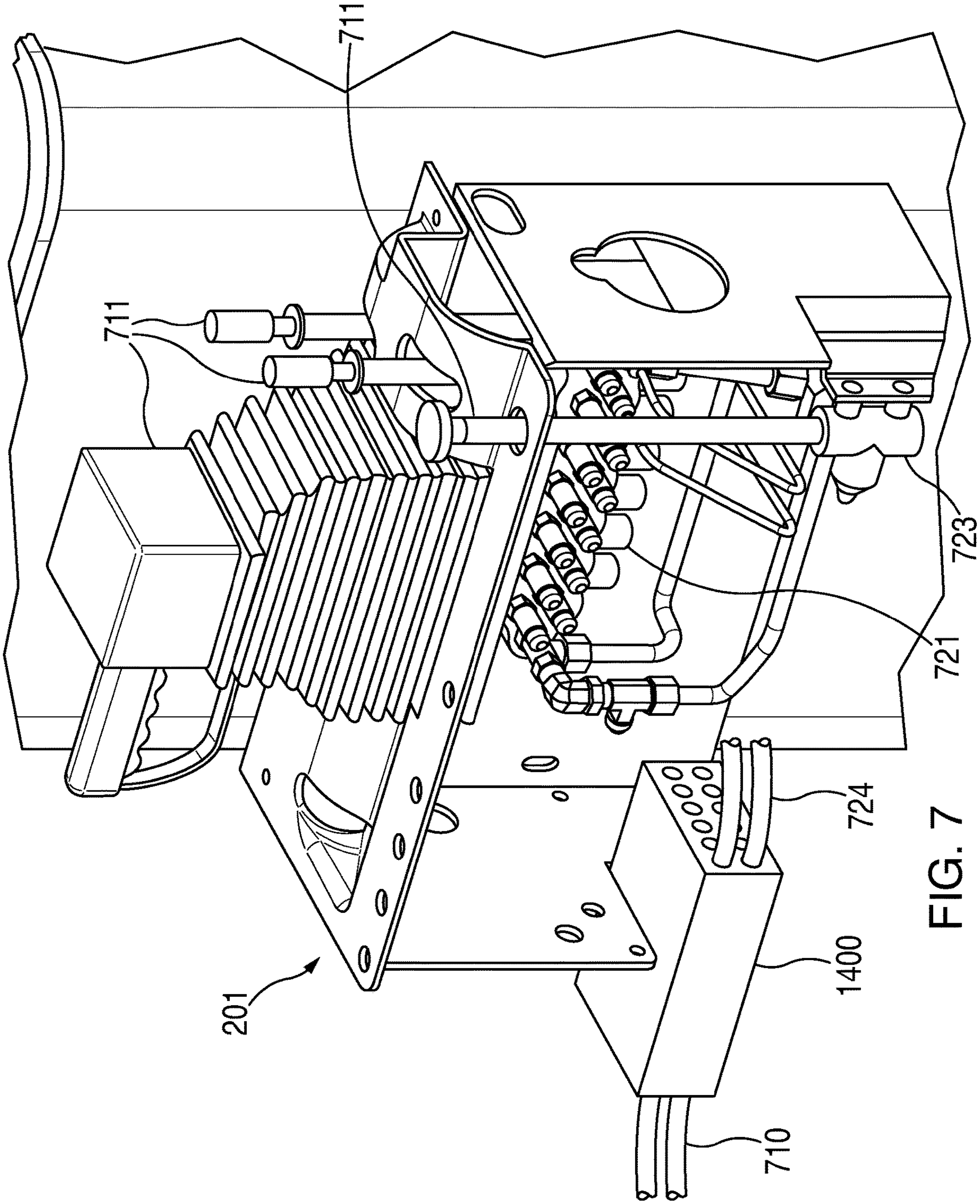
FIG. 7 is an elevational view of another upper control assembly having an isolation member in accordance with certain embodiments.

In the embodiments shown in FIGS. 2-3 and 8-9, the isolation member 130 (or 130') is disposed below the control assembly 120 (or 120') whereby the plurality of through-holes in the manifold are substantially vertical thereby allowing the hydraulic fluid to flow upwards and downwards through the dielectric member. In alternative embodiments, the isolation member may be disposed on one side of the upper control assembly as depicted in FIG. 7, where the plurality of through-holes in the manifold may be substantially horizontal thereby allowing the hydraulic fluid to flow sideways through the dielectric member. The isolation member 1400 illustrated in FIG. 7 may have the same shape and or components as the ones illustrated in FIG. 5, 6 or 10 (e.g., it may or may not include aluminum plates and/or flanges), but may be inverted by 90° to allow the hydraulic fluid to flow sideways in and out of conduits (e.g., 710) and fluid lines that extend sideways into or out of control assembly 201, respectively. Alternatively, it may have a different shape (e.g., it may be thicker with longer through-holes and/or smaller faces through which these holes extend, as depicted in FIG. 7 For simplicity, only part of the components are illustrated in control assembly 201 of FIG. 7, which may be an alternative to the one illustrated in FIG. 3. For example, although a main valve section 721 and a selector valve section 723 are depicted in FIG. 7, no auxiliary or level relief valve sections are depicted. Similarly, although some control handles 711 are depicted in FIG. 7, no auxiliary controls are depicted. Moreover, only an exemplary partial depiction of a pair of fluid lines 724 is shown for illustration purposes in FIG. 7. One of ordinary skill in the art can appreciate how fluid lines and other controls and valve sections may be coupled to isolation member 1400 similar to the description provided above in connection with FIG. 3.

Figure 11:
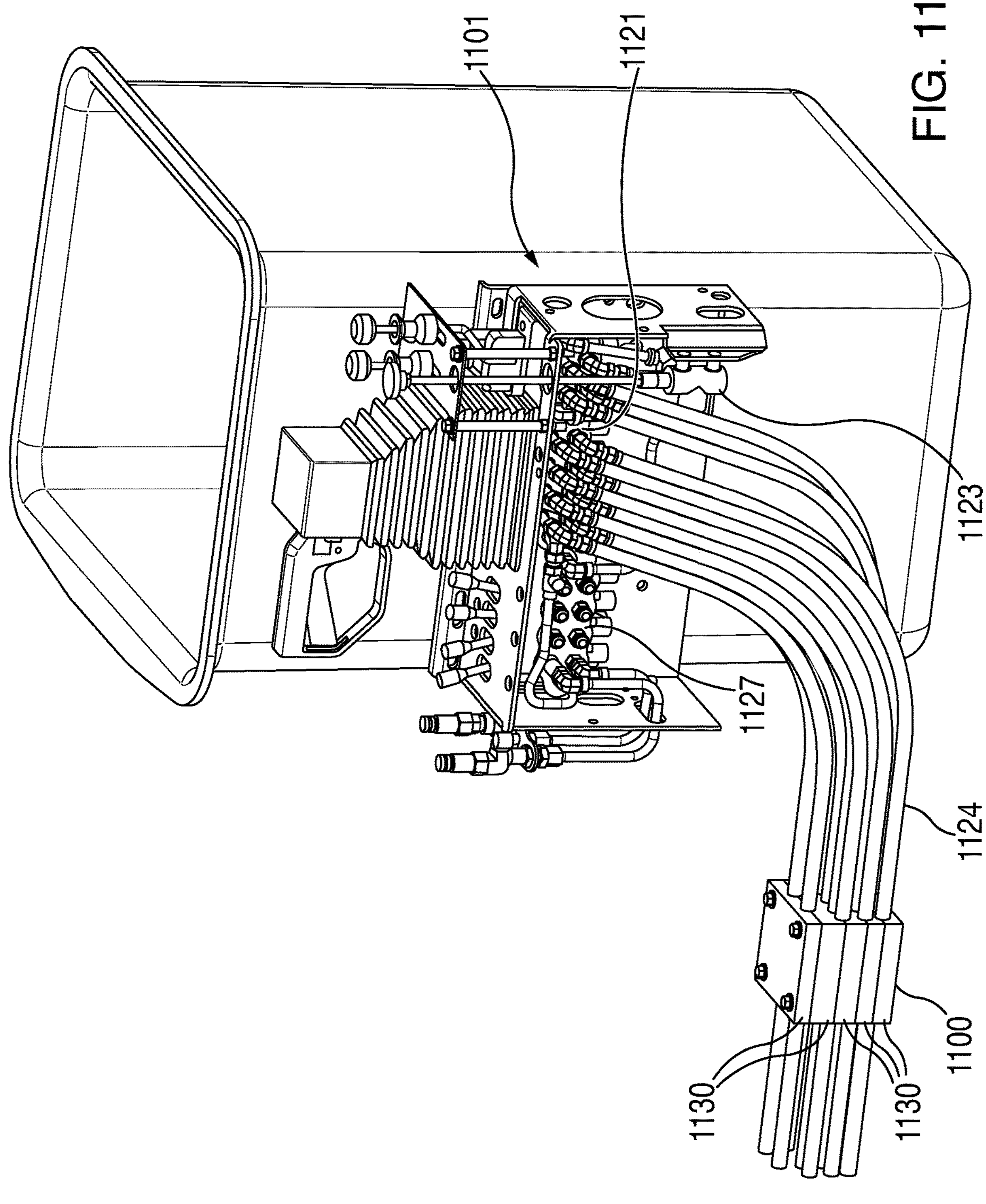
FIG. 11 is an elevational view of yet another upper control assembly having an isolation member in accordance with certain embodiments.

Alternatively, FIG. 11 illustrates other embodiments in which the isolation member may be disposed on one side of the upper control assembly, where the plurality of through-holes in the manifold may be substantially horizontal thereby allowing the hydraulic fluid to flow sideways through the dielectric member. Isolation member 1100 may include several parallel plates 1130 which may be bolted together and clamped on hoses 1124 which carry the hydraulic fluid and which may be the conduits that extend along the boom section as discussed above. Alternatively, isolation member 1100 may be inverted by 90° to allow the hydraulic fluid to flow upwards/downwards. Each plate 1130 may be constructed of material that is substantially electrically non-conductive (such as any of the materials discussed above) and therefore substantially electrically isolates the respective components disposed on either side of the isolation member. Again, for simplicity, only part of the components are illustrated in control assembly 1101 of FIG. 11, which may be an alternative to the one illustrated in FIGS. 3 and 9. For example, although a main valve section 1121, a selector valve section 1123 and an auxiliary valve section 1127 are depicted in FIG. 11, no level relief valve section is depicted and the hoses that flow from valve sections 1123 and 1127 have been omitted for simplicity. One of ordinary skill in the art can appreciate how these and other components may be coupled to isolation member 1100 similar to the description provided above in connection with FIGS. 3 and/or 9.

Figure 12:
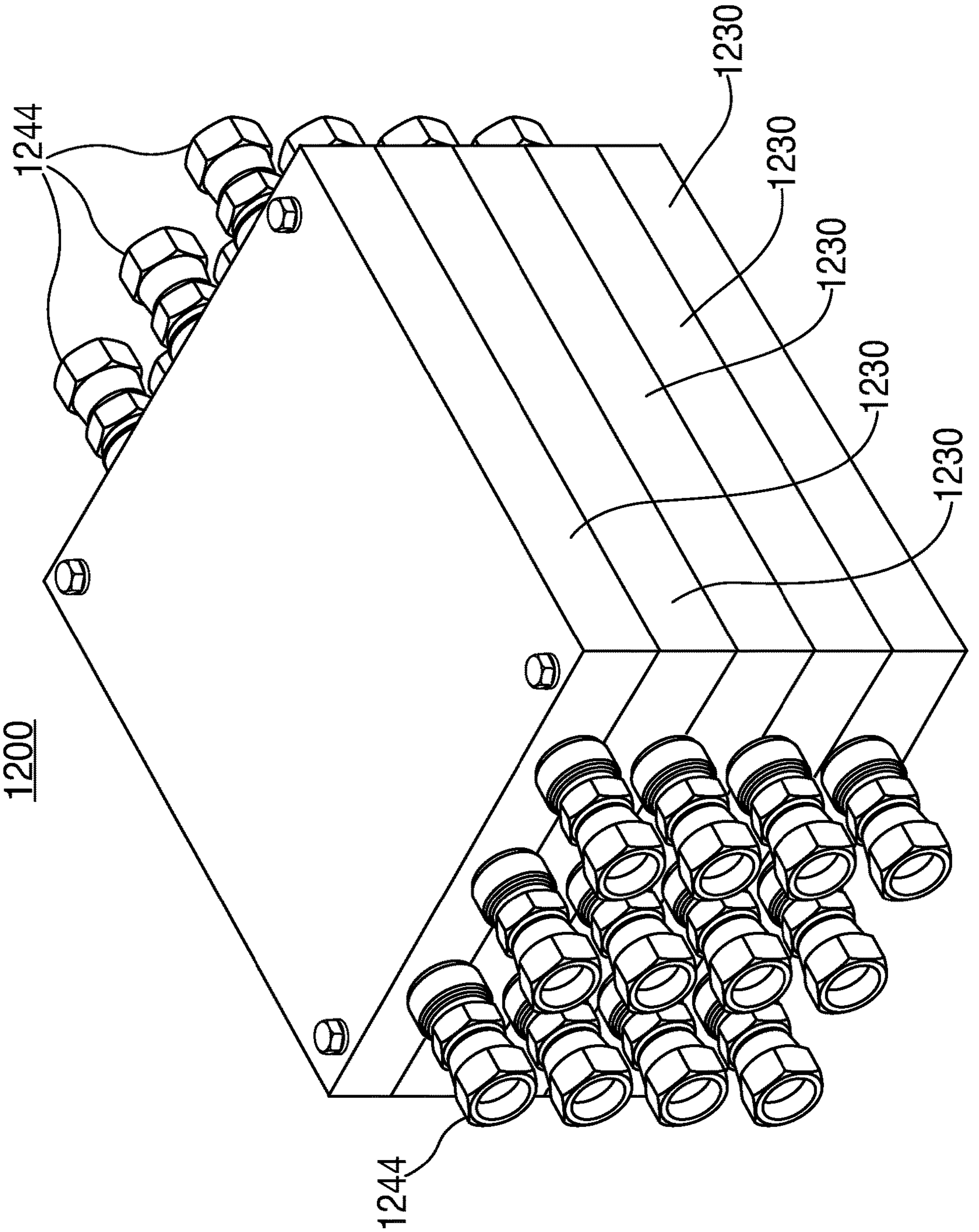
FIG. 12 is a perspective view of another isolation member in accordance with certain embodiments.
Figure 13:
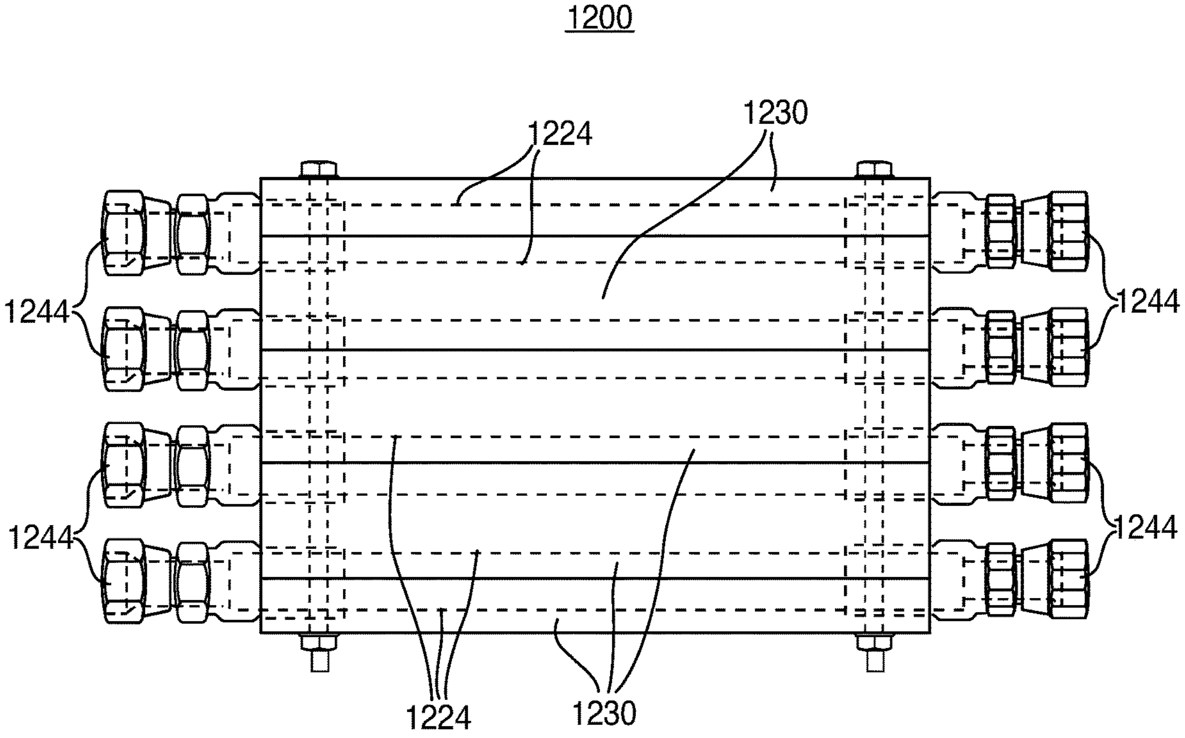
FIG. 13 is a side view of the isolation member of FIG. 12 showing certain internal components in broken lines.

FIGS. 12 and 13 illustrate other alternative embodiments of an isolation member which may be used in conjunction with control assemblies of aerial work platforms. Similar to isolation member 1100 of FIG. 11, isolation member 1200 of FIGS. 12 and 13 may include several parallel plates 1230 which may be bolted together and clamped on hoses 1224 through which the hydraulic fluid may flow. Hoses 1224 may extend from one end of member 1200 to the other end and may be coupled to connectors 1244 at the hose ends. Connectors 1244 may direct hydraulic fluid into and out of the member. Connectors 1244 may also be coupled to either fluid lines or conduits in a manner similar to that described above in connection with other embodiments of the isolation member. Each plate 1230 may be grooved and may be constructed of material that is substantially electrically non-conductive (such as any of the materials discussed above—e.g., plastic) and therefore substantially electrically isolates the respective components disposed on either side of the isolation member.

Figure 14:
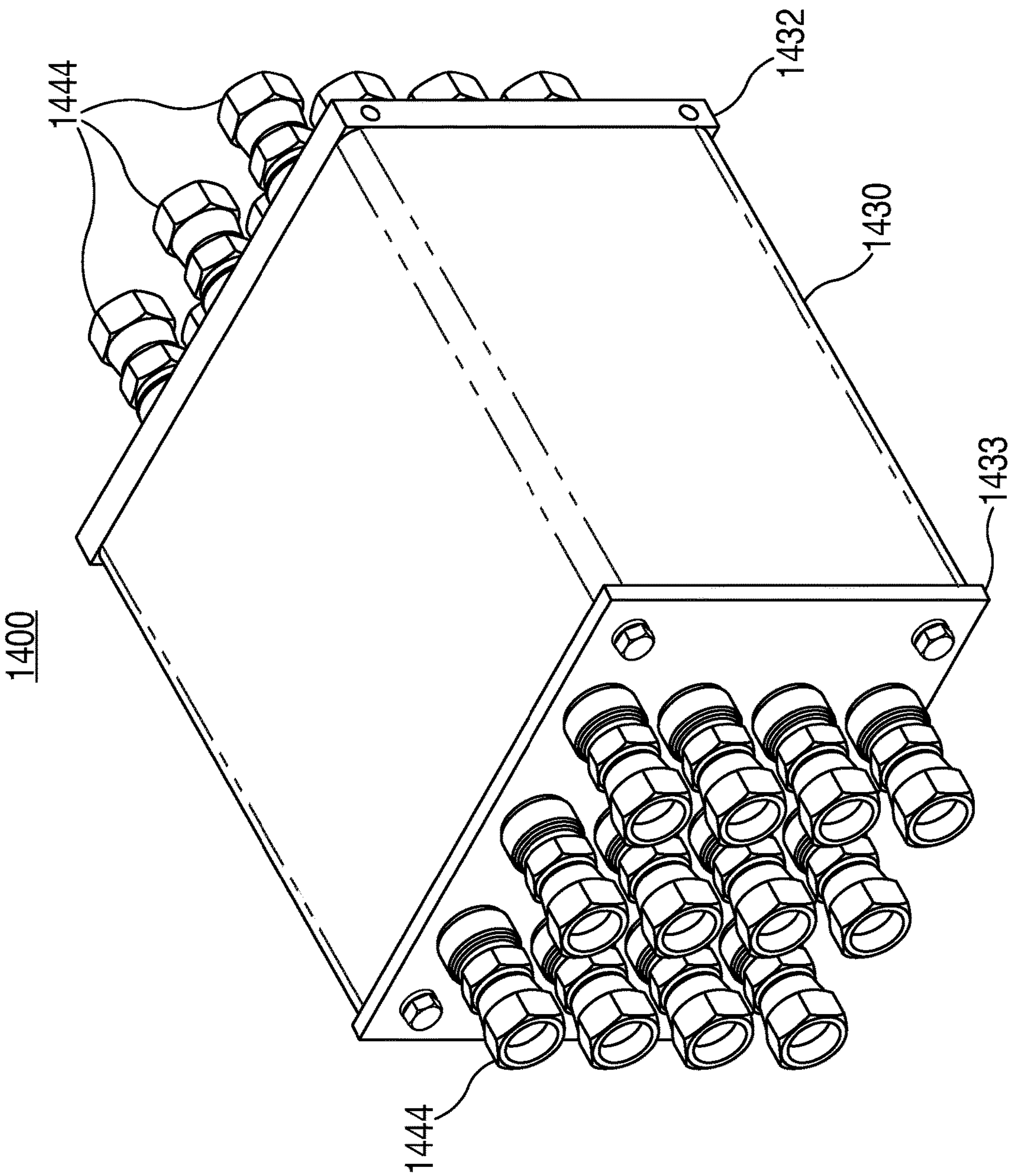
FIG. 14 is a perspective view of another isolation member in accordance with certain embodiments.
Figure 15:
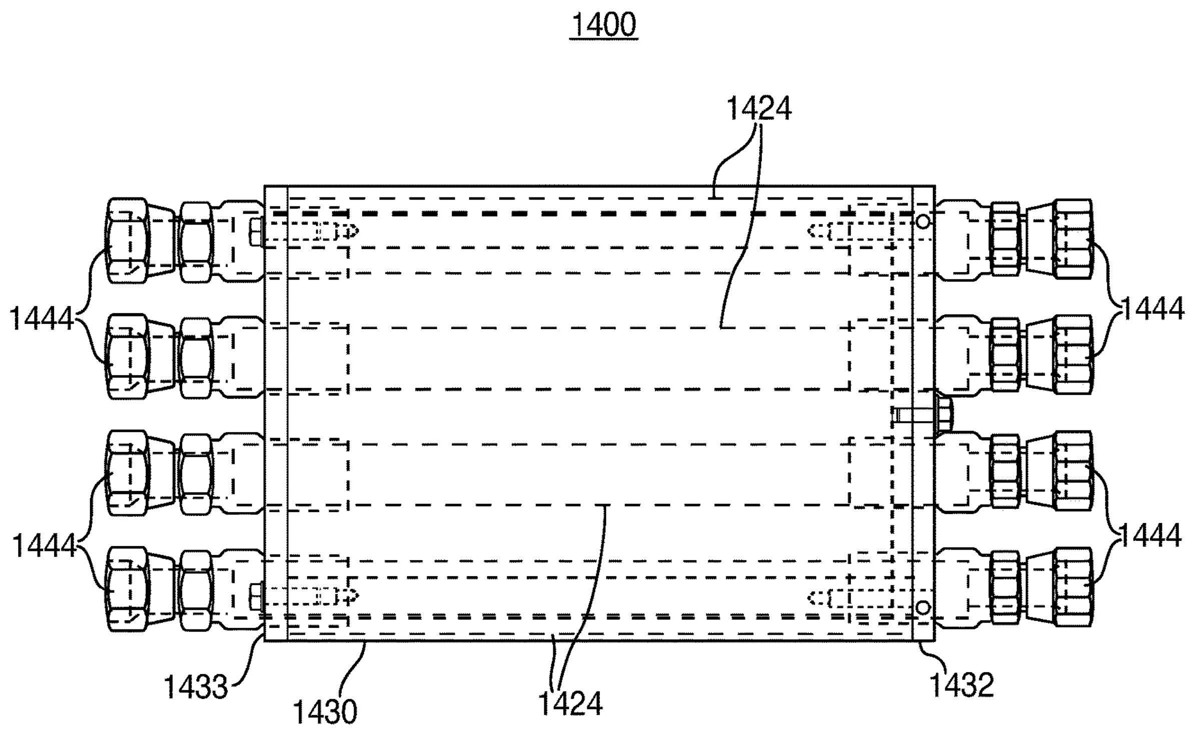
FIG. 15 is a side view of the isolation member of FIG. 14 showing certain internal components in broken lines.

FIGS. 14 and 15 illustrate yet other alternative embodiments of an isolation member which may be used in conjunction with control assemblies of aerial work platforms. Isolation member 1400 may include hoses 1424 which are enclosed within a box-like casing 1430 and through which the hydraulic fluid may flow. Hoses 1424 may extend from one end of member 1400 to the other end and may be coupled to connectors 1444 at the hose ends. Connectors 1444 direct hydraulic fluid into and out of the member. Connectors 1444 may also be coupled to either fluid lines or conduits in a manner similar to that described above in connection with other embodiments of the isolation member. Casing 1430 may be constructed of material that is substantially electrically non-conductive (such as any of the materials discussed above—e.g., plastic). Casing 1430 may be sandwiched between two plates 1432 and 1433, each one of which may be provided with openings into which connectors 1444 may be inserted so as to be connected with hoses 1424. Once hoses 1424 are inserted within casing 1430, the interior may be filled with material that is substantially electrically non-conductive (such as any of the materials discussed above—e.g., plastic) and therefore substantially electrically isolates the respective components disposed on either side of the isolation member.

Furthermore, in the embodiment shown in most of the figures described above, the isolation member is substantially in the shape of a cuboid having six faces each of which may be rectangular and/or some of which may be square. Alternatively, the isolation member may be of any other shape, including a cube with square faces, or may have at least two rectangular or square faces, or may be in the shape of any other polyhedron (e.g., a tetrahedron, pentahedron, hexahedron), whether regular or not, symmetric or not so long as it includes dielectric material with through-holes or hoses through which hydraulic fluid may flow from one end to another.

The isolation member element shown in the embodiments discussed above preferably form an integral part of the upper control assembly. It may be an in-line device and is preferably interposed between fluid lines coupled to the valves and controls in the assembly and the fluid conduits which extend along other portions of the aerial lift such as its boom section or aerial tools.

While there have shown and described and pointed out various novel features of the invention as applied to particular embodiments thereof, it will be understood that various omissions and substitutions and changes in the form and details of the systems and methods described and illustrated, may be made by those skilled in the art without departing from the spirit of the invention. Those skilled in the art will recognize, based on the above disclosure and an understanding therefrom of the teachings of the invention, that the particular components that are part of FIGS. 1-15 and the general functionality provided by and incorporated therein, may vary in different embodiments of the invention. Accordingly, the particular system components shown in FIGS. 1-15 are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation, and the present invention is limited only by the claims which follow.

What is claimed is:

1. An apparatus for improving electrical resistance in aerial work platforms of hydraulic lifts, the apparatus comprising:

a plurality of hoses disposed through a single isolation member that is integrated into an aerial work platform of a hydraulic aerial lift, wherein the plurality of hoses carry fluid for controlling operation of the aerial work platform, and wherein the isolation member is not directly attached to a boom of the hydraulic aerial lift;

a cover coupled to the isolation member, where the cover is constructed of material that is substantially electrically non-conductive material and configured to provide high electrical resistance for the isolation member, as well as protect the isolation member from external elements and leaking fluid;

a fluid tank coupled to the aerial work platform, wherein the fluid tank is disposed on a lower portion of the hydraulic aerial lift that is electrically connected to ground;

wherein the isolation member comprises a manifold constructed of material that is substantially electrically non-conductive and that has a plurality of through-holes, wherein the plurality of hoses are disposed in the plurality of through-holes and extend throughout the isolation member;

wherein the material conducts no more than 400 microamperes at 40 KV AC and no more than 56 microamperes at 56 kV DC, and the plurality of through-holes are configured to allow and withstand fluid to flow through the isolation member at: a) a rate of 6 gpm, b) pressure between 3000 psi and 6000 psi, and c) a temperature between −40 F and 200 F;

wherein the manifold includes a first face and a second face such that the plurality of through-holes extend from the first face to the second face so as to allow the fluid to flow through the plurality of hoses;

wherein the plurality of hoses extend from the first face of the manifold;

wherein the plurality of hoses extend from the second face of the manifold;

wherein the isolation member is coupled to a control panel via the plurality of hoses extending out of the isolation member, the control panel comprising one or more metallic valves and control handles, and the control panel and the part of hoses connecting the control panel and isolation member are covered by an upper cover;

wherein the isolation member substantially isolates the aerial work platform from the fluid tank, from electrically connected sources disposed at the lower portion of the hydraulic aerial lift that are electrically connected to the ground, and from upper portions of the aerial lift that are electrically connected to the ground; and wherein the material of the manifold and the cover is selected from the group consisting of a plastic, ceramic, and glass material.

2. The apparatus of claim 1, wherein the manifold has six surfaces, including the first face and the second face, and the first face is parallel to the second face.

3. The apparatus of claim 1, wherein the manifold has tapped holes and the isolation member is affixed to the aerial work platform through the tapped holes.

4. The apparatus of claim 1, further comprising:

a pair of metallic plates coupled to the isolation member, wherein each metallic plate is coupled to the manifold through a plurality of bolts that hold the metallic plate flush against the manifold.

5. The apparatus of claim 4, wherein the first metallic plate is i) larger than the second metallic plate, and ii) has screw holes for affixing the isolation member to a side of the aerial work platform.

6. The apparatus of claim 1, wherein the plurality of through-holes in the manifold are substantially vertical thereby allowing the fluid to flow upwards and downwards through the isolation member.

7. The apparatus of claim 1, wherein the plurality of through-holes in the manifold is substantially horizontal thereby allowing the fluid to flow sideways through the isolation member.

8. The apparatus of claim 1, further comprising:

a tool attached to the aerial work platform through a fitting, and a side cover that is constructed of substantially electrically non-conductive material, wherein the side cover is coupled to the aerial work platform and disposed on the platform, and wherein the side cover protects the aerial work platform from external elements.

9. The apparatus of claim 8, wherein the tool is selected from the group consisting of a drill, a saw, and an impact tool.

* * * * *